United States Patent
Fripp et al.

(10) Patent No.: US 10,190,385 B2
(45) Date of Patent: Jan. 29, 2019

(54) DOWNHOLE TOOLS COMPRISING SEALING ELEMENTS COMPOSED OF ELASTOMER AND ANHYDROUS ACID PARTICLES

(71) Applicant: Halliburton Energy Services, Inc., Houston, TX (US)

(72) Inventors: Michael Linley Fripp, Carrollton, TX (US); Zachary William Walton, Carrollton, TX (US); Aaron M. Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 255 days.

(21) Appl. No.: 15/106,435

(22) PCT Filed: Feb. 1, 2016

(86) PCT No.: PCT/US2016/015885
§ 371 (c)(1),
(2) Date: Jun. 20, 2016

(87) PCT Pub. No.: WO2016/204822
PCT Pub. Date: Dec. 22, 2016

(65) Prior Publication Data
US 2017/0204697 A1   Jul. 20, 2017

(51) Int. Cl.
| | |
|---|---|
| *E21B 33/12* | (2006.01) |
| *E21B 43/26* | (2006.01) |
| *E21B 29/02* | (2006.01) |
| *C08K 5/09* | (2006.01) |
| *E21B 33/128* | (2006.01) |

(Continued)

(52) U.S. Cl.
CPC .......... *E21B 33/1208* (2013.01); *C08K 5/092* (2013.01); *E21B 29/02* (2013.01); *E21B 33/12* (2013.01); *E21B 33/128* (2013.01); *E21B 33/129* (2013.01); *E21B 43/26* (2013.01)

(58) Field of Classification Search
CPC ........................... E21B 33/1208; C08K 5/092
See application file for complete search history.

(56) References Cited

U.S. PATENT DOCUMENTS

| | | | |
|---|---|---|---|
| 7,168,494 B2 | 1/2007 | Starr et al. | |
| 7,699,101 B2 | 4/2010 | Fripp et al. | |

(Continued)

FOREIGN PATENT DOCUMENTS

| | | |
|---|---|---|
| EP | 1320540 A2 | 6/2003 |
| WO | 2015163889 A1 | 10/2015 |

(Continued)

OTHER PUBLICATIONS

International Search Report and Written Opinion received in corresponding International Application No. PCT/US2016/015885, dated May 11, 2016.

*Primary Examiner* — Jennifer H Gay
(74) *Attorney, Agent, or Firm* — McGuireWoods LLP

(57) ABSTRACT

Downhole tools, and methods and systems related thereto, comprising a body; and at least one sealing element composed of an elastomer and anhydrous acid particles, and wherein at least a portion of the sealing element hydrolytically degrades in a wellbore environment. The anhydrous acid particles hydrolyze to form an acid that accelerates degradation of the sealing element.

19 Claims, 5 Drawing Sheets

(51) Int. Cl.
 *E21B 33/129* (2006.01)
 *C08K 5/092* (2006.01)

(56) References Cited

U.S. PATENT DOCUMENTS

| | | | |
|---|---|---|---|
| 8,181,708 B2 | 5/2012 | Korte et al. | |
| 8,230,936 B2 | 7/2012 | Davies et al. | |
| 9,790,763 B2* | 10/2017 | Fripp | E21B 33/12 |
| 9,879,500 B2* | 1/2018 | Okura | E21B 33/12 |
| 2005/0205266 A1 | 9/2005 | Todd et al. | |
| 2007/0044966 A1* | 3/2007 | Davies | C09K 8/516 |
| | | | 166/287 |
| 2011/0067889 A1* | 3/2011 | Marya | E21B 33/134 |
| | | | 166/386 |
| 2012/0073812 A1* | 3/2012 | Cochran | E21B 33/10 |
| | | | 166/283 |
| 2012/0125630 A1 | 5/2012 | Sevre | |
| 2013/0025859 A1 | 1/2013 | Liang et al. | |
| 2013/0081821 A1 | 4/2013 | Liang et al. | |
| 2013/0233546 A1 | 9/2013 | Liang et al. | |
| 2013/0292123 A1 | 11/2013 | Murphree et al. | |
| 2014/0190685 A1* | 7/2014 | Frazier | E21B 33/1208 |
| | | | 166/250.01 |
| 2015/0000911 A1* | 1/2015 | Cochran | E21B 33/12 |
| | | | 166/290 |
| 2015/0285026 A1* | 10/2015 | Frazier | E21B 33/1291 |
| | | | 166/120 |
| 2016/0201425 A1* | 7/2016 | Walton | E21B 33/1208 |
| | | | 166/376 |
| 2016/0201427 A1* | 7/2016 | Fripp | E21B 33/1208 |
| | | | 166/297 |
| 2016/0376869 A1* | 12/2016 | Rochen | E21B 23/06 |
| | | | 166/135 |
| 2017/0204697 A1* | 7/2017 | Fripp | E21B 33/1208 |
| 2017/0240712 A1* | 8/2017 | Sugawara | C08J 3/24 |

FOREIGN PATENT DOCUMENTS

| | | |
|---|---|---|
| WO | 2016007119 A1 | 1/2016 |
| WO | 2016007259 A1 | 1/2016 |
| WO | 2016007260 A1 | 1/2016 |

* cited by examiner

DOWNHOLE TOOLS COMPRISING SEALING ELEMENTS COMPOSED OF ELASTOMER AND ANHYDROUS ACID PARTICLES

CROSS-REFERENCE TO RELATED APPLICATIONS

This application claims priority to PCT/US2014/045535, titled "Downhole Tools Comprising Aqueous-Degradable Sealing Elements," filed Jul. 7, 2014; PCT/US2015/035823, titled "Downhole Tools Comprising Aqueous-Degradable Elastomer Sealing Elements with Carbodiimide," filed Jun. 15, 2015; PCT/US2015/035812, titled "Downhole Tools Comprising Cast Degradable Sealing Elements," and filed Jun. 15, 2015; and PCT/US2015/067286, titled "Downhole Tools Comprising Aqueous-Degradable Sealing Elements of Thermoplastic Rubber," and filed Dec. 22, 2015.

BACKGROUND

The present disclosure generally relates to downhole tools comprising sealing elements and, more specifically, to downhole tools comprising a body and a sealing element composed of an elastomer and anhydrous acid particles, wherein at least a portion of the sealing element degrades in a wellbore environment.

A variety of downhole tools are within a wellbore in connection with producing or reworking a hydrocarbon bearing subterranean formation. The downhole tool may comprise a wellbore zonal isolation device capable of fluidly sealing two sections of the wellbore from one another and maintaining differential pressure (i.e., to isolate one pressure zone from another). The wellbore zonal isolation device may be used in direct contact with the formation face of the wellbore, with casing string, with a screen or wire mesh, and the like.

After the production or reworking operation is complete, the seal formed by the downhole tool must be broken and the tool itself removed from the wellbore. The downhole tool must be removed to allow for production or further operations to proceed without being hindered by the presence of the downhole tool. Removal of the downhole tool(s) is traditionally accomplished by complex retrieval operations involving milling or drilling the downhole tool for mechanical retrieval. In order to facilitate such operations, downhole tools have traditionally been composed of drillable metal materials, such as cast iron, brass, or aluminum. These operations can be costly and time consuming, as they involve introducing a tool string (e.g., a mechanical connection to the surface) into the wellbore, milling or drilling out the downhole tool (e.g., at least breaking the seal), and mechanically retrieving the downhole tool or pieces thereof from the wellbore to bring to the surface.

To reduce the cost and time required to mill or drill a downhole tool from a wellbore for its removal, degradable downhole tools have been developed. Traditionally, however, such degradable downhole tools have been designed only such that the degradable portion includes the tool body itself and not any sealing element of the downhole tool. This is particularly evident because the degradable materials that have been proposed for use in forming a downhole tool body are often highly brittle and are physically or chemically incapable of exhibiting expansive or elastic properties necessary for a sealing element. Instead, the known degradable downhole tools may degrade such that it no longer provides the structural integrity necessary for achieving an effective seal with the non-degradable sealing element. Indeed, common additives to sealing elements, such as carbon black and acids used for crosslinking or vulcanization which are consumed during manufacture of the sealing element, do not result in degradation of the sealing element.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
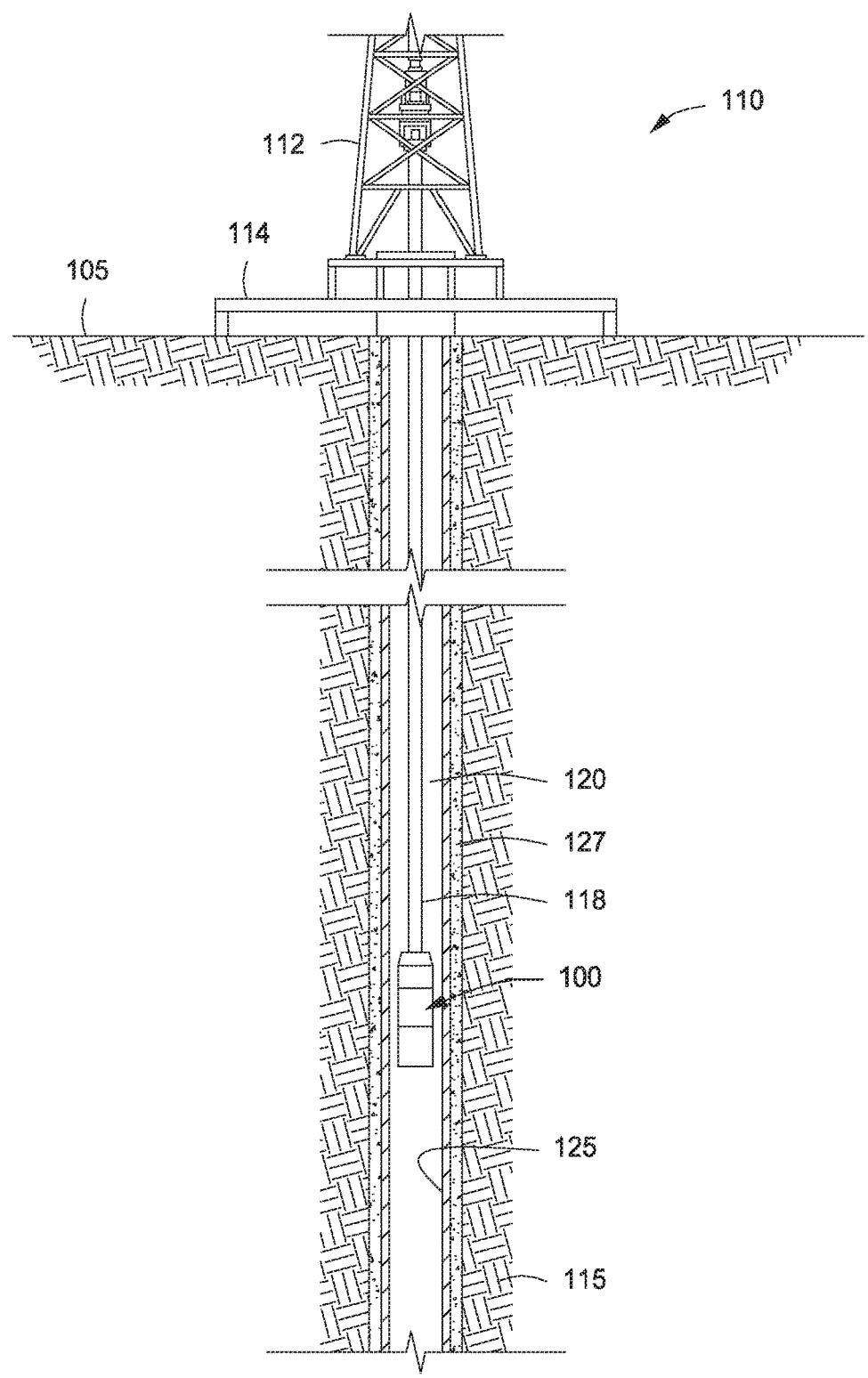
FIG. 1 illustrates a cross-sectional view of a well system comprising a downhole tool, according to one or more embodiments described herein.

The present disclosure generally relates to downhole tools comprising sealing elements and, more specifically, to downhole tools comprising a body and a sealing element composed of an elastomer and anhydrous acid particles, wherein at least a portion of the sealing element degrades in a wellbore environment. The anhydrous acid particles are hydrolyzed (which may also involve a size increase of the anhydrous acid particles) in the wellbore environment to accelerate degradation of the sealing element. In some embodiments, all or a portion of the body is also degradable in the wellbore environment. In such instances, the anhydrous acid particles, once hydrolyzed, may additionally accelerate degradation of the degradable portion of the body.

As used herein, the term "degradable," and all of its grammatical variants (e.g., "degrade," "degradation," "degrading," and the like), refers to the dissolution or chemical conversion of materials into smaller components, intermediates, or end products by at least one of solubilization, hydrolytic degradation, biologically formed entities (e.g., bacteria or enzymes), chemical reactions, thermal reactions, or reactions induced by radiation. In preferred embodiments, the sealing elements of the present disclosure degrade by hydrolytic degradation. The term "at least a portion" with reference to degradation (e.g., "at least a portion of the sealing element is degradable" or "at least a portion of the body is degradable," or "at least a portion of the sealing element is hydrolytically degradable," and grammatical variants thereof) refers to degradation of at least about 80% of the volume of that part. In some instances, the degradation of the material may be sufficient for the mechanical properties of the material to reduce to a point that the material no longer maintains its integrity and, in essence, falls apart. The conditions for degradation are generally wellbore conditions where an external stimulus may be used to initiate or affect the rate of degradation. For example, the embodiments of the present disclosure employ sealing elements comprising anhydrous acid particles that accelerate degradation of at least the sealing element and, in some instances, other portions of the downhole tool composed of a degradable material. The term "wellbore environment" includes both naturally occurring wellbore environments and introduced materials into the wellbore.

Disclosed are various embodiments of a downhole tool including a sealing element composed of an elastomer (including one or more elastomers) and anhydrous acid particles. The sealing element is capable of fluidly sealing two sections of a wellbore (which may be also referred to as "setting" the downhole tool). The downhole tool may have various setting mechanisms for fluidly sealing the two sections of the wellbore with the sealing element including, but not limited to, hydraulic setting, mechanical setting, setting by swelling, setting by inflation, and the like. The downhole tool may be a wellbore isolation device, such as a frac plug, a bridge plug, a packer, a wiper plug, a cement plug, or any other tool requiring a sealing element for use in a downhole operation. Such downhole operations may include, but are not limited to, any type of fluid injection operation (e.g., a stimulation/fracturing operation, a pinpoint acid stimulation, casing repair, and the like), and the like. In some embodiments, the downhole tool may comprise a body and at least one sealing element composed of an elastomer and anhydrous acid particles. The sealing element degrades in a wellbore environment, such as upon contact with an aqueous fluid therein. As discussed in detail below, degradation of the sealing element may be accelerated, rapid, or normal, degrading anywhere from about 2 hours to about 120 days from first contact with a stimulus in the wellbore environment (e.g., an aqueous fluid), wherein degradation is further accelerated due to the presence of the anhydrous acid particles.

In some embodiments, the elastomer forming the sealing element is aqueous-degradable and degradation is in an aqueous fluid wellbore environment. The anhydrous acid particles are hydrolyzed upon contact with the aqueous fluid wellbore environment and form an acid (e.g., hydrolysis of anhydrous citric acid, or hydrolysis of maleic anhydride to generate maleic acid). The acid further accelerates hydrolytic degradation of the aqueous-degradable elastomer forming a portion of the sealing element. While the present disclosure focuses on hydrolytic degradation of the sealing elements described herein in an aqueous fluid wellbore environment, it will be appreciated that the elastomer forming the sealing element may be oil-degradable (e.g., in the presence of a hydrocarbon wellbore environment) and the presence of the anhydrous acid particles will also accelerate degradation of the oil-degradable elastomer. For example, the elastomer (e.g., a urethane elastomer) can break down into its monomeric units that are soluble in a hydrocarbon (i.e., oil). This solubility can drive the equilibrium of the degradation of the elastomer. In essence, the degraded elastomer products are favored in the $K_{eq}$ (equilibrium constant) of the degradation mechanism and, thus, helps push the degradation process in the forward direction. Degradation of the elastomer forming the sealing element may additionally be achieved or otherwise affected (e.g., in addition to hydrolytic degradation or degradation by an acid) by elevated temperature, salinity (or pH) of a fluid contacting the elastomer, and any combination thereof.

In some embodiments, at least a portion of the body itself may also be degradable upon exposure to the wellbore environment. The embodiments herein permit fluid sealing of two wellbore sections with a downhole tool having a sealing element that later degrades in situ, where such degradation is accelerated by the presence of anhydrous acid particles, preferably without the need to mill or drill and retrieve the downhole tool from the wellbore. In particular, the degradation of the sealing element results in failure of the sealing element to maintain differential pressure and form an effective seal. In such cases, the downhole tool may drop into a rathole in the wellbore without the need for retrieval or may be sufficiently degraded in the wellbore so as to be generally indiscernible. It will be appreciated by one of skill in the art that while the embodiments herein are described with reference to a downhole tool, the sealing elements composed of an elastomer and anhydrous acid particles disclosed herein may be used with any wellbore operation equipment that may preferentially degrade upon exposure to a stimuli, such as aqueous fluids, and where accelerated degradation is desirable (i.e., by the anhydrous acid particles).

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressed in the present specification and associated claims are to be understood as being modified in all instances by the term "about." As used herein, the term "about" encompasses+/−5% of a numerical value. For example, if the numerical value is "about 80%," then it can be 80%+/−5%, equivalent to 76% to 84%. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Referring now to FIG. 1, illustrated is an exemplary well system 110 for a downhole tool 100. As depicted, a derrick 112 with a rig floor 114 is positioned on the earth's surface 105. A wellbore 120 is positioned below the derrick 112 and the rig floor 114 and extends into subterranean formation 115. As shown, the wellbore may be lined with casing 125 that is cemented into place with cement 127. It will be appreciated that although FIG. 1 depicts the wellbore 120 having a casing 125 being cemented into place with cement 127, the wellbore 120 may be wholly or partially cased and wholly or partially cemented (i.e., the casing wholly or partially spans the wellbore and may or may not be wholly or partially cemented in place), without departing from the scope of the present disclosure. Moreover, the wellbore 120 may be an open-hole wellbore. A tool string 118 extends from the derrick 112 and the rig floor 114 downwardly into the wellbore 120. The tool string 118 may be any mechanical connection to the surface, such as, for example, wireline, slickline, jointed pipe, or coiled tubing. As depicted, the tool string 118 suspends the downhole tool 100 for placement into the wellbore 120 at a desired location to perform a specific downhole operation. In some embodiments, the downhole tool 100 is connected to the tool string 118 via a means such as physical connection, or a connection using one or more portions of the downhole tool 100 (e.g., components of the body, such as slips, wedges, and the like, or the sealing element). That is, the tool string 118 may be tubing inside of the casing string 125 (or the wellbore 120 if casing string is not used) and the downhole tool 100 may be hydraulically pumped or gravitationally placed therein where the connection between the tool string 118 and the downhole tool 100 is due to pressure contact (e.g., slips, wedges, sealing element, and the like) between the downhole tool 100 and the interior of the tool string 118. In some instances, the tool string 118 and the casing string 125 are one and the same (i.e., the casing string is a type of tool string), and the downhole tool 100 is connected to the inner diameter (e.g., the pressure contact described below) thereto. As previously mentioned, the downhole tool 100 may be any type of wellbore zonal isolation device including, but not limited to, a frac plug, a bridge plug, a packer, a wiper plug, or a cement plug.

It will be appreciated by one of skill in the art that the well system 110 of FIG. 1 is merely one example of a wide variety of well systems in which the principles of the present disclosure may be utilized. Accordingly, it will be appreciated that the principles of this disclosure are not necessarily limited to any of the details of the depicted well system 110, or the various components thereof, depicted in the drawings or otherwise described herein. For example, it is not necessary in keeping with the principles of this disclosure for the wellbore 120 to include a generally vertical cased section. The well system 110 may equally be employed in vertical, horizontal, and/or deviated (i.e., slanted from true vertical or true horizontal) wellbores, without departing from the scope of the present disclosure. Furthermore, it is not necessary for a single downhole tool 100 to be suspended from or otherwise connected to the tool string 118.

In addition, it is not necessary for the downhole tool 100 to be lowered into the wellbore 120 using the derrick 112. Rather, any other type of device suitable for lowering the downhole tool 100 into the wellbore 120 for placement at a desired location may be utilized without departing from the scope of the present disclosure such as, for example, mobile workover rigs, well servicing units, and the like. Although not depicted, the downhole tool 100 may alternatively be hydraulically pumped into the wellbore and, thus, not need the tool string 118 for delivery into the wellbore 120, although the downhole tool 100 may be otherwise connected to (i.e., in contact with) a tool string 118 located within the wellbore 120.

Although not depicted, the structure of the downhole tool 100 may take on a variety of forms to provide fluid sealing between two wellbore sections. The downhole tool 100, regardless of its specific structure as a specific type of wellbore zonal isolation device, comprises a body and a sealing element. Both the body and the sealing element may each be composed of the same material (i.e., all or a portion of the body may be composed of the elastomer and anhydrous acid particles described herein, and any other additives). Generally, however, the body provides structural rigidity and other mechanical features to the downhole tool 100 and the sealing element is a resilient (i.e., elastic) material capable of providing a fluid seal between two sections of the wellbore 120.

Figure 2:
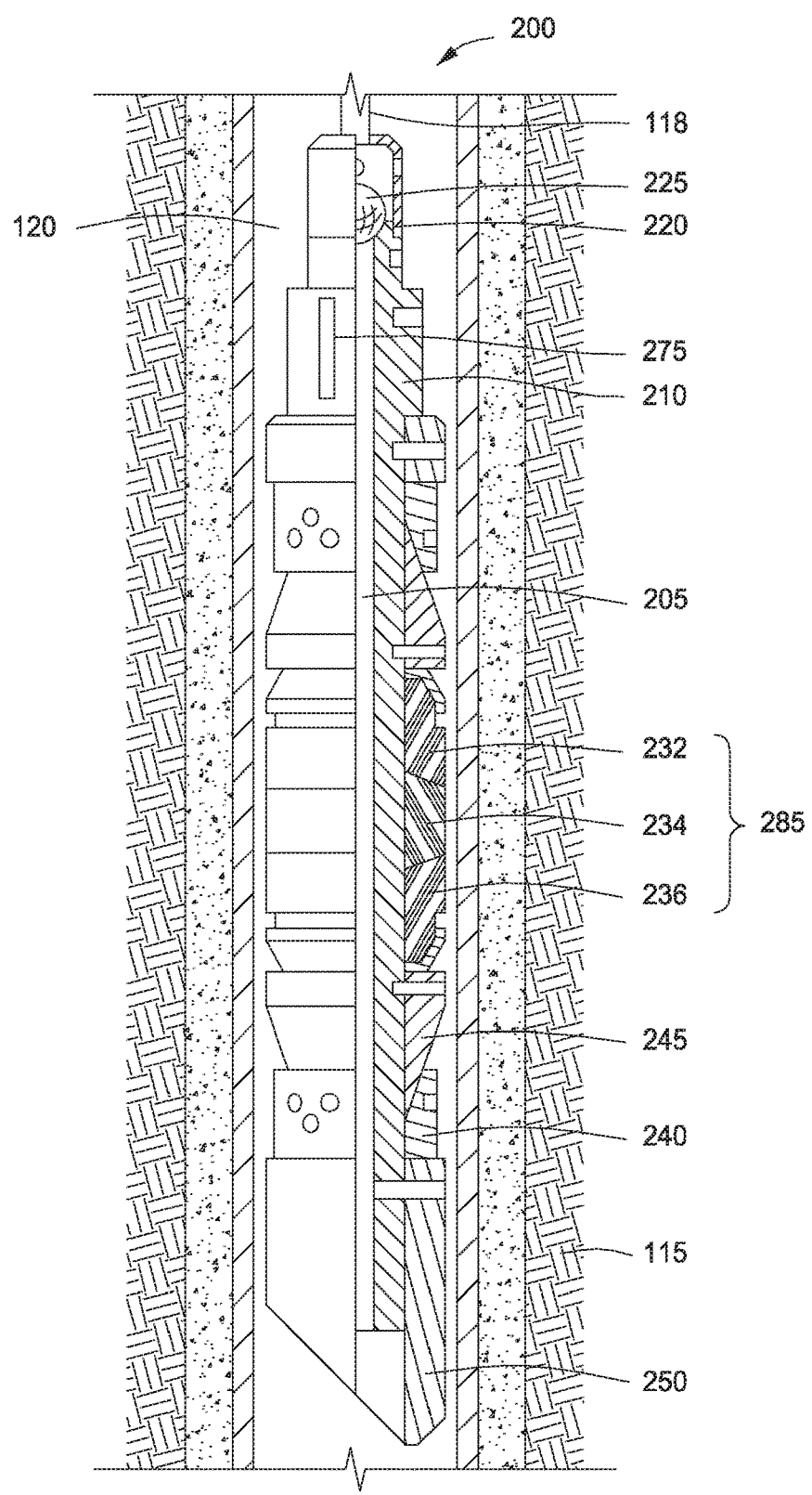
FIG. 2 depicts an enlarged cross-sectional view of a downhole tool, according to one or more embodiments described herein.

Referring now to FIG. 2, with continued reference to FIG. 1, one specific type of downhole tool described herein is a frac plug wellbore zonal isolation device for use during a well stimulation/fracturing operation. FIG. 2 illustrates a cross-sectional view of an exemplary frac plug 200 being lowered into a wellbore 120 on a tool string 118. As previously mentioned, the frac plug 200 generally comprises a body 210 and a sealing element 285. The body 210 comprises a plurality of components, as described below. As used herein, the term "components," and grammatical variants thereof, with reference to the body 210 refers to any structure (e.g., functional structure) in contact with the body 210 that is not the sealing element 285. In some embodiments, the sealing element 285 may be resilient and have a Shore A durometer hardness in an amount of from about 60 to about 100, encompassing any value and subset therebetween. For example, the sealing element 285 may have a Shore A durometer hardness in an amount of from about 70 to about 90, or of from about 70 to about 80, or from about 75 to about 85, encompassing any value and subset therebetween. For example, in some embodiments, the sealing element 285 may be resilient and have a Shore A durometer hardness of from about 75 to about 95. Each of these values is critical to the embodiments of the present disclosure and may depend on a number of factors including, but not limited to, the material selected to form the sealing element 285, the operation to be performed by the downhole tool 100 (FIG. 1), the type of downhole tool 100, and the like.

The sealing element 285, as depicted, comprises an upper sealing element 232, a center sealing element 234, and a lower sealing element 236. It will be appreciated that although the sealing element 285 is shown as having three portions (i.e., the upper sealing element 232, the center sealing element 234, and the lower sealing element 236), any other number of portions, or a single portion, may also be employed without departing from the scope of the present disclosure.

As depicted, the sealing element 285 is extending around the body 210; however, it may be of any other configuration suitable for allowing the sealing element 285 to form a fluid seal in the wellbore 120, without departing from the scope of the present disclosure. For example, in some embodiments, the body may comprise two sections joined together by the sealing element, such that the two sections of the body compress to permit the sealing element to make a fluid seal in the wellbore 120. Other such configurations are also suitable for use in the embodiments described herein. Moreover, although the sealing element 285 is depicted as located in a center section of the body 210, it will be appreciated that it may be located at any location along the length of the body 210, without departing from the scope of the present disclosure.

The body 210 of the frac plug 200 comprises an axial flowbore 205 extending therethrough. A cage 220 is formed at the upper end of the body 210 for retaining a ball 225 that acts as a one-way check valve. In particular, the ball 225 seals off the flowbore 205 to prevent flow downwardly therethrough, but permits flow upwardly through the flowbore 205. One or more slips 240 are mounted around the body 210 below the sealing element 285. The slips 240 are guided by a mechanical slip body 245. A tapered shoe 250 is provided at the lower end of the body 210 for guiding and protecting the frac plug 200 as it is lowered into the wellbore 120. An optional enclosure 275 for storing a chemical solution may also be mounted on the body 210 or may be formed integrally therein. In one embodiment, the enclosure 275 is formed of a frangible material.

The sealing element 285 of the downhole tool 100 is composed of an elastomer and anhydrous acid particles. At least a portion of the sealing element 285 is hydrolytically degradable in a wellbore environment, and in some embodiments at least a portion of the body 210 (e.g., one or more components of the body 210) is also hydrolytically degradable in a wellbore environment. As used herein, the term "hydrolytic degradation" refers to the degradation of a material by cleavage of chemical bonds in the presence (e.g., by the addition of, or upon contact with) an aqueous fluid. The portion of the sealing element 285 (or the portion of the body 210) that is hydrolytically degradable at least partially degrades in the presence of an aqueous fluid in a wellbore environment, such as preexisting aqueous fluids therein or introduced aqueous fluid (e.g., by a wellbore operator or wellbore equipment). Thus, the elastomer described herein may wholly degrade or partially degrade; however, as applicable to the sealing element 285, the amount of degradation is capable of causing the sealing element 285 to no longer maintain a fluid seal in the wellbore capable of maintaining differential pressure. The aqueous fluid that may degrade the elastomer includes, but is not limited to, fresh water, saltwater (e.g., water containing one or more salts dissolved therein), brine (e.g., saturated salt water), seawater, produced water, wastewater (either treated or untreated), mud (water-based mud or oil-based mud), or combinations thereof.

The hydrolytic degradation of the elastomer forming at least a portion of the sealing element 285 and/or the degradation of any degradable portion of the body 210 (including where the portion of the body 210 is formed from an elastomer as described herein) may be by a number of mechanisms. For example, the degradation may be by swelling, dissolving, undergoing a chemical change, undergoing thermal degradation in combination with any of the foregoing, and any combination thereof. Degradation by swell involves the absorption by the elastomer or other degradable material of a fluid (e.g., an aqueous fluid) in the wellbore environment such that the mechanical properties of the elastomer or material degrade. That is, the elastomer or degradable material continues to absorb the fluid until its mechanical properties are no longer capable of maintaining the integrity of the elastomer or degradable material at least partially falls apart. In some embodiments, the elastomer or other degradable material may be designed to only partially degrade by swelling in order to ensure that the mechanical properties of the sealing element 285 and/or body 210 formed from the elastomer or other degradable material is sufficiently capable of lasting for the duration of the specific operation in which it is utilized (e.g., of maintaining a seal). Degradation by dissolving involves use of an elastomer or other degradable material that is soluble or otherwise susceptible to fluids (e.g., aqueous fluids), such that the fluid is not necessarily incorporated into the elastomer or degradable material (as is the case with degradation by swelling), but becomes soluble upon contact with the fluid. Degradation by undergoing a chemical change may involve breaking the bonds of the backbone of the elastomer polymer (e.g., polymer backbone) or degradable material, or causing the bonds of the elastomer or degradable material to crosslink, such that it becomes brittle and breaks into small pieces upon contact with even small forces expected in the wellbore environment. Thermal degradation involves a chemical decomposition due to heat, such as the heat present in a wellbore environment. Thermal degradation of some elastomers and/or degradable materials described herein may occur at wellbore environment temperatures of greater than about 50° C. (or about 120° F.). Thermal degradation may work in concert with one or more of the other degradation methods described herein. Accordingly, the use of the anhydrous acid particles to accelerate degradation of the elastomer can be used to affect degradation even at wellbore environment temperatures less than what would initiate thermal degradation. Combinations of any of the aforementioned degradation methods may occur for any given elastomer and/or degradable material for use in forming all or a portion of the downhole tools described herein.

The degradation rate of the elastomer forming the sealing element 285 may be accelerated, rapid, or normal, as defined herein. Rapid degradation may be in the range of from about 2 hours to about 36 hours, encompassing any value or subset therebetween. Normal degradation may be in the range of from about 36 hours to about 14 days, encompassing any value or subset therebetween. Extended degradation may be in the range of from about 14 days to about 120 days, encompassing any value or subset therebetween. Accordingly, the degradation may be of from about 120 minutes to about 120 days, or about 2 hours to about 36 hours, or about 36 hours to about 14 days, or about 14 days to about 120 days, encompassing any value and subset therebetween. Each of these values is critical and depends on a number of factors including, but not limited to, the type of elastomer selected, the conditions of the wellbore environment, the amount of contact with an aqueous fluid, the type and amount of anhydrous acid particles included in the sealing element 285, and the like. It is to be appreciated that these degradation rates are accelerated by inclusion of the anhydrous acid particles described herein upon their hydrolysis, as described herein.

The elastomer forming a portion of the sealing element 285 (and/or one or more portions of the body 210, if applicable) described herein may be a material that is resilient (i.e., elastic) and is at least partially hydrolytically degradable in a wellbore environment, and whose degradation is accelerated upon exposure to an acid (e.g., upon hydrolyzing the anhydrous acid particles forming a portion of the sealing element 285). Accordingly, as stated above, any of the elastomers, elastomer combinations, elastomer additives (including the anhydrous acid particles), and combinations thereof described herein with reference to the sealing element 285 may be used to form one or more portions of the body 210, without departing from the scope of the present disclosure, and without limitation.

In some embodiments, the elastomer is a material that comprises ester linkages and wherein hydrolytic degradation of the elastomer occurs by degradation of the ester linkages. Suitable examples of elastomers for forming a portion of the sealing element 285 include, but are not limited to, a polyurethane rubber (e.g., cast polyurethanes, thermoplastic polyurethanes, polyethane polyurethanes), a polyester-based polyurethane rubber (e.g., lactone polyester-based thermoplastic polyurethanes), a polyether-based polyurethane rubber, a thiol-based rubber, a hyaluronic acid rubber, a hydroxybutyrate rubber, a polyester elastomer (e.g., polyether/ester copolymers, polyester/ester copolymers, and the like), a polyester amide elastomer, a polyamide elastomer, a starch-based resin (e.g., starch-poly(ethylene-co-vinyl alcohol), starch-polyvinyl alcohol, starch-polylactic acid, starch-polycaprolactone, starch-poly(butylene succinate), and the like), a polyethylene terephthalate polymer, a polybutylene terephthalate polymer, a polylactic acid polymer, a polybutylene succinate polymer, a polybutylene succinate polymer, a polyhydroxy alkanoic acid polymer, an acrylate-based polymer, a blend of chlorobutadiene rubber/reactive clay/crosslinked sodium polyacrylate, a polystyrene polymer, a cellulose-based rubber (e.g., carboxy methyl cellulose), a polyethylene glycol-based hydrogel, a silicone-based hydrogel, a polyacrylamide-based hydrogel, a polymacon-based hydrogel, copolymers thereof, terpolymers thereof, and any combination thereof.

In some preferred embodiments, the elastomer(s) selected for use in forming the portion of the sealing element 285 described herein is a polyurethane rubber, a polyester-based polyurethane rubber, a polyether-based polyurethane rubber, and any combination thereof (collectively simply "polyurethane-based rubbers). These polyurethane-based rubbers degrade in water through a hydrolytic reaction, although other degradation methods may also affect the degradability of the polyurethane-based rubbers, including exposure to the hydrolyzed anhydrous acid particles described herein. Polyurethane-based rubbers traditionally are formed by reacting a polyisocyanate with a polyol. In the embodiments described herein, although non-limiting, the polyol for forming a polyurethane-based rubber may be a natural oil polyol, a polyester polyol (e.g., polybutadienes (e.g., polybutanediol adipate), polycaprolactones, polycarbonates, and the like), or a polyether polyol (e.g., polytetramethylene ether glycol, polyoxypropylene-glycol, polyoxyethylene glycol, and the like). In some embodiments, polyester polyols are preferred, as they are more readily degradable upon contact with an aqueous fluid. However, any polyol may be used to form the polyurethane-based rubber for use as the elastomer described herein, and each is critical to the disclosed embodiments, as the amount of desired degradation over time may depend on a number of factors including the conditions of the subterranean formation, the subterranean formation operation being performed, and the like. Indeed, because the sealing element 285 additionally includes anhydrous acid particles, the resultant acid upon hydrolyzing the anhydrous acid particles assists with degradation. Combinations of these polyols may also be used, without departing from the scope of the present disclosure.

Accordingly, the rate of hydrolytic degradation of a polyurethane-based rubber for use as the elastomers described herein may be adjusted and controlled based on the order of the polyol addition, as well as the polyol properties and quantities. As an example, in some embodiments, the amount of polyol is included in an amount of from about 0.25 to about 2 of the polyisocyanate in the polyurethane-based rubber, encompassing any value and subset therebetween. For example, the amount of polyol included may be in an amount in the range of from about 0.25 to about 1.75, or about 0.5 to about 1.5, or about 0.75 to about 1 stoichiometric ratio of the polyisocyanate in the polyurethane-based rubber, encompassing any value and subset therebetween. The amount of polyol included is bound by stoichiometry of the polymerization per chemical reaction. Each of these values is critical to the embodiments described herein and may depend on a number of factors including, but not limited to, the desired hydrolytic degradation rate, the type of polyol(s) selected, the type of subterranean operation being performed, and the like.

In some embodiments, where the elastomer selected is a polyurethane-based rubber for use in the sealing element 285, the inclusion of a low functionality initiator may be included to impart flexibility to the sealing element 285. Such low functionality initiators may include, but are not limited to dipropylene glycol, glycerine, sorbitol/water solution, and any combination thereof. As used herein, the term "low functionality initiator," and grammatical variants thereof, refers to the average number of isocyanate reactive sites per molecule in the range of from about 1 to about 5, encompassing any value and subset therebetween. For example, the average number of isocyanate reactive sites per molecule may be of from about 1 to about 3, or about 3 to about 5, encompassing any value and subset therebetween. These low functionality initiators impart flexibility to the sealing element 285 and may be included in the polyurethane-based rubbers described herein in an amount in the range of from about 1% to about 50% by weight of the polyol in the polyurethane-based rubber, encompassing any value and subset therebetween. For example, the polyurethane-based rubbers described herein in an amount in the range of from about 1% to about 10%, or about 10% to about 25%, or about 25% to about 35%, or about 35% to about 50% by weight of the polyol in the polyurethane-based rubber, encompassing any value and subset therebetween. Additionally, in some embodiments, higher molecular weight polyols for use in forming the polyurethane-based rubbers described herein may impart flexibility to the sealing element 285 described herein. For example, in some embodiments, the molecular weight of the selected polyols may be in the range of from about 200 Daltons (Da) to about 20000 Da, encompassing any value and subset therebetween. For example, the molecular weight of the selected polyols may be in the range of from about 200 Da to about 5000 Da, or about 5000 Da to about 10000 Da, or about 10000 Da to about 15000 Da, or about 15000 Da to about 20000 Da, encompassing any value and subset therebetween. Each of these values is critical to the embodiments described herein and may depend on a number of factors including, but not limited to, the desired flexibility of the elastomer (and thus, e.g., the sealing element 285), the type of subterranean formation operation being performed, the conditions of the wellbore environment, and the like, and any combination thereof.

In some embodiments, the selected elastomer is a polyurethane-based rubber that further includes a curative such as toluene diisocyanate, 4,4'-diphenylmethane diisocyanate, an amine curative, a polysulfide curative, and any combination thereof. Typically, the curative used as part of a vulcanization process for crosslinking the elastomer, and is typically present in an amount of about 0.1% to about 20% by weight of the polyurethane-based rubber, encompassing any value and subset therebetween. For example, the amount of curative may be about 0.1% to about 1%, or about 1% to about 4%, or about 4% to about 8%, or about 8% to about 12%, or about 12% to about 16%, or about 16% to about 20%, or about 2% to about 18%, or about 4% to about 16%, or about 6% to about 14%, or about 8% to about 12% by weight of the polyurethane-based rubber, encompassing any value and subset therebetween. Each of these values is critical to the embodiments described herein and depend on a number of factors including, but not limited to, the selected polyurethane-based rubber (e.g., the preferred polyester-based polyurethane rubber), the selected curative, other additives included in the elastomer, the process for forming the elastomer, and the like, and any combination thereof.

In other preferred embodiments, the elastomer described herein may be formed from a thiol-based polymer. As used herein, the term "thiol" is equivalent to the term "sulfhydryl." The thiol-based polymer comprises at least one thiol functional group. In some embodiments, the thiol-based polymer may comprise thiol functional groups in the range of from about 1 to about 22, encompassing every value and subset therebetween. For example, of from about 1 to about 5, or about 5 to about 10, or about 10 to about 15, or about 15 to about 22, encompassing any value and subset therebetween. In other embodiments, the thiol-based polymer may comprise even a greater number of thiol functional groups. Each of these values is critical to the embodiments of the present disclosure and may depend on a number of factors including, but not limited to, the desired degradation rate, the desired degradation process, and the like.

The thiol-based polymer may be, but is not limited to, a thiol-ene reaction product, a thiol-yne reaction product, a thiol-epoxy reaction product, and any combination thereof. The thiol-based polymers, whether the reaction product of thiol-ene, thiol-yne, or thiol-epoxy, may be referred to herein as generally being the reaction product of a thiol functional group and an unsaturated functional group, and may be formed by click chemistry. The thiol functional group is an organosulfur compound that contains a carbon-bonded sulfhydryl, represented by the formula —C—SH or R—SH, where R represents an alkane, alkene, or other carbon-containing group of atoms.

Thiol-ene reactions may be characterized as the sulfur version of a hydrosilylation reaction. The thiol-ene reaction product may be formed by the reaction of at least one thiol functional group with a variety of unsaturated functional groups including, but not limited to, a maleimide, an acrylate, a norborene, a carbon-carbon double bond, a silane, a Michael-type nucleophilic addition, and any combination thereof. As used herein, the term "Michael-type nucleophilic addition," and grammatical variants thereof, refers to the nucleophilic addition of a carbanion or another nucleophile to an α,β-unsaturated carbonyl compound, having the general structure (O=C)—C$^\alpha$=C$^\beta$—. An example of a suitable thiol-ene reaction product may include, but is not limited to, 1,3,5,-triacryloylhexahydro-1,3,5-triazine. Examples of suitable thiol-ene/silane reaction products that may be used in forming at least a portion of the downhole tool 100 (FIG. 1) or component thereof include, but are not limited to, the following Formulas 1-6:

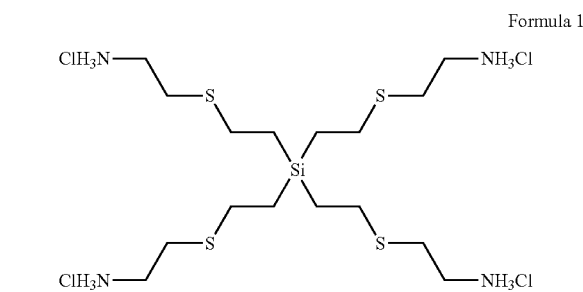

Formula 1

In Formula 1, it is to be appreciated that the nitrogen atoms are positively charged and chlorine atoms are negatively charged.

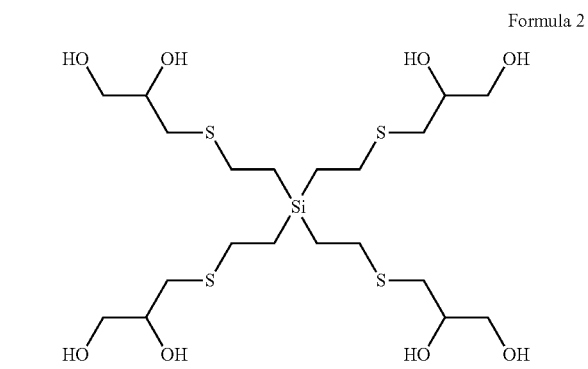

Formula 2

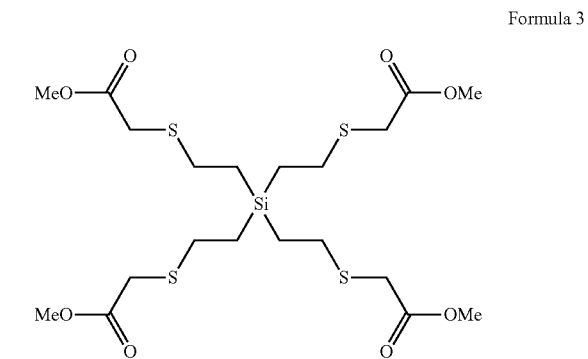

Formula 3

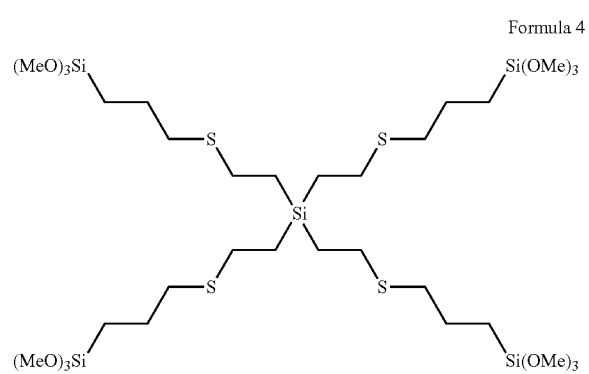

Formula 4

-continued

Formula 5

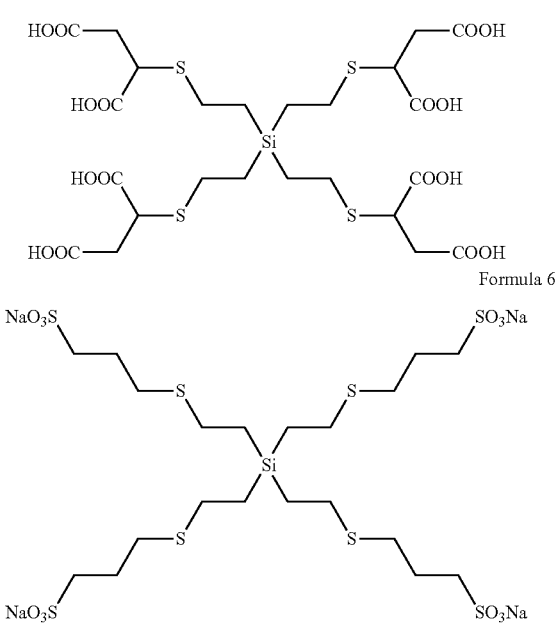

Formula 6

In Formula 6, it is to be appreciated the sodium atoms are positively charged and one oxygen atom on each sulfate group is the negatively charged counteranion.

The thiol-yne reaction products may be characterized by an organic addition reaction between a thiol functional group and an alkyne, the alkyne being an unsaturated hydrocarbon having at least one carbon-carbon triple bond. The addition reaction may be facilitated by a radical initiator or UV irradiation and proceeds through a sulfanyl radical species. The reaction may also be amine-mediated, or transition-metal catalyzed.

The thiol-epoxy reaction products may be prepared by a thiol-ene reaction with at least one epoxide functional group. Suitable epoxide functional groups may include, but are not limited to, a glycidyl ether, a glycidyl amine, or as part of an aliphatic ring system. Specific examples of epoxide functional groups may include, but are not limited to, bisphenol-A diglycidyl ether, triglycidylisocyanurate, trimethylolpropane triglycidyl ether, and any combination thereof. The thiol-epoxy reaction products may proceed by one or more of the mechanisms presented below; however, other mechanisms may also be used without departing from the scope of the present disclosure:

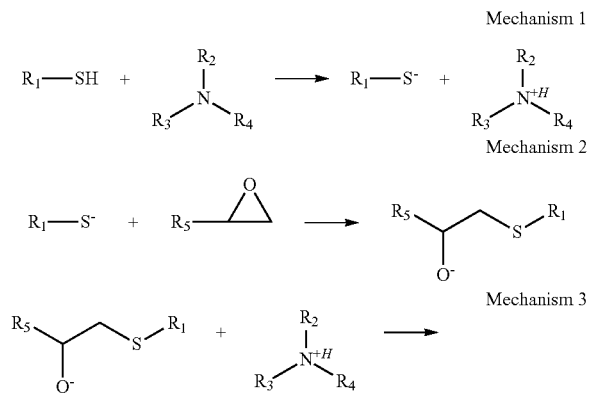

As mentioned above, the thiol-based polymer may comprise at least one thiol functional group and at least one degradable functional group. Such degradable functional groups may include, but are not limited to, one or more of a degradable monomer, a degradable oligomer, or a degradable polymer. Specific examples of degradable functional groups may include, but are not limited to, an acrylate, a lactide, a lactone, a glycolide, an anhydride, a lactam, an allyl, a polyethylene glycol, a polyethylene glycol-based hydrogel, an aerogel, a poly(lactide), a poly(glycolic acid), a poly(vinyl alcohol), a poly(N-isopropylacrylamide), a poly(ε-caprolactone, a poly(hydroxybutyrate), a polyanhydride, an aliphatic polycarbonate, an aromatic polycarbonate, a poly(orthoester), a poly(hydroxyl ester ether), a poly(orthoester), a poly(amino acid), a poly(ethylene oxide), a polyphosphazene, a poly(phenyllactide), a poly(hydroxybutyrate), a dextran, a chitin, a cellulose, a protein, an aliphatic polyester, and any combination thereof.

In some embodiments, the thiol-based polymer comprises at least one polyethylene glycol-based hydrogel, such as one formed by a four-arm polyethylene glycol norbornene that is crosslinked with dithiol containing crosslinkers to form a chemically crosslinked hydrogel to impart swelling properties. The swelling properties of such a hydrogel may vary depending on a number of factors including, but not limited to, network density, the degree of crosslinking, and any combination thereof. In some embodiments, the degree of crosslinking may be desirably increased in order to achieve a higher tensile modulus and reduced swelling percentage.

In some embodiments, the elastomer forming a portion of the sealing element 285 (or one or more portions or components of the body 210) or the sealing element 285 as a whole is formed by a molding process, or preferably by a casting process. During either one of these processes, the anhydrous acid particles described herein may be added to the elastomer, for example, without departing from the scope of the present disclosure (e.g., when the anhydrous acid particles are integral to the elastomer). As described herein, the term "molding," and grammatical variants thereof (e.g., "molding process," and the like), refers to a manufacturing process in which solid elastomer(s) (and any additional additives, if applicable, including the anhydrous acid particles described herein) is heated into a pliable solid and shaped with a die. The term encompasses dies that produce particular shaped materials, and those that produce long-continuous shapes (e.g., tubes or cylinders, and the like). Where the sealing element 285 as a whole is formed using the molding process, the anhydrous acid particles described herein, and any additional additives, are formed using the molding process. Molding typically requires a molding machine including various parts, such as a hopper, a heater, a reciprocating screw, a mold cavity, a removable platen, among others. Single molds are made for each desired shape, and are made by technical toolmakers out of a metal (e.g., steel or aluminum) and thereafter precision-machined to form desired features. Molding generally requires high pressure and high velocity injection of the heated (or molten) elastomer (and any additional additives, if applicable) into the die cavity. Generally, the molding process used for forming a molded elastomer(s) and/or a molded sealing element(s) 285 described herein is either an injection molding process, a compression molding process, or an extrusion molding process.

As stated above, in a preferred embodiment, the elastomer forming a portion of the sealing element 285 or the sealing element 285 as a whole is formed by a casting process, which uses lower curing temperatures thus simplifying addition of the anhydrous acid particles described herein. As used herein, the term "cast," and grammatical variants thereof (e.g., "casting," "casting process," and the like) refers to a manufacturing process in which a mold is filled with a liquid elastomer (and any additional additives, if applicable), followed by hardening. Where the sealing element 285 as a whole is formed using the casting process, the anhydrous acid particles described herein, and any additional additives, are added during the casting process. Hardening is a polymerization process meaning that the elastomer(s) are polymerized, typically through heat, a chemical reaction, and/or irradiation. In many cases, a cast elastomer(s) and/or a cast sealing element 285 formed by the casting process described herein are considered "thermoset," meaning that once hardened, the elastomer or sealing element 285 cannot be heated and melted to be shaped differently. In other cases, a cast elastomer(s) or a cast sealing element(s) 285 are considered "thermoplastic," meaning that once hardened, the cast elastomer(s) or the sealing element(s) 285 can be heated and melted to be shaped differently. In some embodiments, a thermoset cast elastomer(s) or a thermoset cast sealing element(s) 285 may be preferred for uses in downhole environments, particularly those having high temperatures to prevent the cast elastomer(s) or the cast sealing element(s) 285 from softening, melting, or become misshapen.

The casting process for forming the cast elastomer(s) and/or cast sealing element(s) 285 described herein is performed by utilizing the liquid phase of the degradable elastomer and a low-cost mold at reduced temperatures and low pressures, typically atmospheric pressure. The casting molds may be flexible and made of low cost materials, such as latex rubber, room temperature vulcanized silicone rubber, or other rubbers. Cast molds may also be constructed from metals such as aluminum or steel, or from plastics such as polytetrafluoroethylene (Teflon). The cast elastomer(s) and/or cast sealing element(s) 285 described herein may be formed using gravity casting (i.e., mere use of gravity to fill the mold), vacuum casting (i.e., pulling a vacuum to fill the mold), pressure casting (i.e., applying a small pressure to compress any bubbles within the resin), and any combination thereof. Vacuum casting may further be used simply to remove any bubbles or other imperfections, as well as vibration, pressure, or centrifugation.

Typically, the pressure used for forming the cast elastomer(s) and/or the cast sealing element(s) 285 of the present disclosure may be from about 0.1 pounds per square inch (psi) to about 250 psi, encompassing every value and subset therebetween. One (1) psi is equal to 6894.757 pascals. The temperature used for forming the cast materials of the present disclosure may be from about 20° C. to about 150° C., encompassing every value and subset therebetween. Each of these values is critical to the embodiments of the present disclosure and may depend on a number of factors including, but not limited to, the type of elastomer selected, any additives included in the elastomer (e.g., anhydrous acid particles, thermoplastics, and the like), the downhole tool component created (e.g., the sealing element 285 or a component of the body 210), and the like, and combinations thereof.

In some preferred embodiments, the elastomer alone or as part of the sealing element 285 as a whole is formed using the casting process and the selected elastomer is one or more of a polyurethane rubber, a polyester-based polyurethane rubber, a polyether-based polyurethane rubber, a thiol-based polymer, a hyaluronic acid rubber, a polyhydroxybutyrate rubber, a polyester elastomer, a polyester amide elastomer, a polyamide elastomer, a starch-based resin, a polyethylene terephthalate polymer, a polyester elastomer, an acrylate-based polymer, a polystyrene polymer, a cellulose-based rubber, copolymers thereof, terpolymers thereof, and any combination thereof. In some preferred embodiments, the elastomer alone or as part of the sealing element 285 as a whole is formed using the casting process and the elastomer is one or more of a polyurethane rubber, a polyester-based polyurethane rubber, a polyether-based polyurethane rubber, a hyaluronic acid rubber, a polyhydroxybutyrate rubber, a polyester elastomer, a polystyrene polymer, a cellulose-based rubber, and any combination thereof. In other preferred embodiments, the elastomer alone or as part of the sealing element 285 as a whole using the casting process is a polyester-based polyurethane rubber.

The elastomers forming a portion of the sealing element 285 include anhydrous acid particles. That is, the anhydrous acid particles may be integral (e.g., using the molding or cast process), or otherwise associated with the sealing element 285, such as by use of an adhesive, mechanical means, an encapsulating material, and the like. In preferred embodiments, the anhydrous acid particles are integral with the elastomer, such that the elastomer and the anhydrous acid particles alone form a complete structure without the use of additional elements, although additional elements may be included and may affect the structure of the elastomer and anhydrous acid particles. The anhydrous acid particles may be integral to the elastomer and spatially present anywhere within or along the perimeter of the elastomer. In some embodiments, the anhydrous acid particles are at least partially along the perimeter of the elastomer (e.g., along the perimeter of the sealing element 285), such that the anhydrous acid particles are only covered by a thin layer the elastomer and are hydrolyzed quickly (e.g., as soon as the then layer of elastomer is degraded) upon contact with an aqueous fluid in a wellbore environment, such as to maximize acceleration of the elastomer. In other embodiments, the anhydrous acid particles are embedded deeper in the structure of the elastomer (e.g., in a middle portion or toward the inner diameter of the sealing element 285, such that degradation of the elastomer takes place to some degree prior to hydrolyzing the anhydrous acid particles with an aqueous fluid in the wellbore environment. In yet other embodiments, the outer surface of the sealing element 285 is dusted with the anhydrous acid particles, such that they reside on the outer surface of the sealing element 285 without a layer (thin or otherwise) of elastomer covering the anhydrous acid particles. This configuration is possible if the sealing element 285 is placed within the wellbore in the absence of an aqueous fluid, such that the anhydrous acid particles will hydrolyze immediately upon contact with an aqueous fluid in the wellbore environment after it is set.

The anhydrous acid particles forming a portion of the sealing element 285 (or a portion of the body 210) react with an aqueous fluid in the wellbore environment, where the aqueous fluid hydrolyzes the anhydrous acid particles. Once hydrolyzed, the anhydrous acid particles form an acid that accelerates degradation of the elastomer and, in some cases, other degradable materials included in the sealing element 285 and/or the body 210. The amount of acceleration of the elastomer upon hydrolyzing the anhydrous acid particles depends on a number of factors including, but not limited to, the type and amount of anhydrous acid particles, the type and amount of elastomer, the type and amount of aqueous fluid contacting the elastomer and/or anhydrous acid particles, the conditions of the wellbore environment (e.g., temperature), and the like, and any combination thereof.

The anhydrous acid particles are solid particles, although they may be porous; that is, the anhydrous acid particles are not liquid or gaseous. The anhydrous acid particles hydrolyze in an aqueous fluid (e.g., in a wellbore environment) to form an acid, and are themselves anhydrous pro-acids. As used herein, the term "pro-acid," and grammatical variants thereof, refers to a material that hydrolyzes upon contact with an aqueous fluid to form an acid. Examples of suitable pro-acids for use in forming the anhydrous acid particles described herein include, but are not limited to, an anhydrous ester (e.g., an anhydrous carbonate, an anhydrous phosphate, and the like), an anhydrous lactone, an anhydrous formate, an anhydrous formate ester, an anhydrous acetate, an anhydrous propionate, an anhydrous butyrate, an anhydrous acrylate, an anhydrous acrylate ester, an anhydrous ethylsuccinate, and any combination thereof. Specific examples of anhydrous pro-acids for use as the anhydrous acid particles described herein include, but are not limited to, anhydrous citric acid, anhydrous urea hydrochloride, anhydrous phosphorous pentoxide, anhydrous maleic acid, anhydrous formic acid, anhydrous acetic formic acid, a metal salt (e.g., one that generates hydrochloric acid in the presence of an aqueous fluid, or one that lowers the pH of an aqueous fluid to initiate degradation), and any combination thereof.

The anhydrous acid particles, in some embodiments, hydrolyze in the presence of an aqueous fluid to form an acid including, but not limited to, a carboxylic acid, a polycarboxylic acid, an amino carboxylic acid, an amino polycarboxylic acid, a mineral acid, an organic acid, and any combination thereof. Specific acids formed by hydrolyzing the anhydrous acid particles of the present disclosure include, but are not limited to, citric acid, hydrochloric acid, trichloroacetic acid, perchloric acid, acetic acid, nitric acid, oxalic acid, steric acid, boric acid, maleic acid, phosphoric acid, formic acid, and any combination thereof. In preferred embodiments, the acid formed by hydrolyzing the anhydrous acid particles of the present disclosure is citric acid.

For example, the anhydrous acid particles can be anhydrous citric acid which hydrolyzes to form citric acid monohydrate, or anhydrous urea hydrochloride which hydrolyzes to form hydrochloric acid, or anhydrous phosphoric pentoxide which hydrolyzes to form phosphoric acid, or anhydrous maleic acid which hydrolyzes to form maleic acid, or anhydrous formic acid which hydrolyzes to form formic acid, or anhydrous acetic formic acid which hydrolyzes to form acetic acid and formic acid, and the like, and any combination thereof.

The anhydrous acid particles of the present disclosure are present in an amount of less than or equal to maximum packing volume in the sealing element 285. As used herein, the term "maximum packing volume," and grammatical variants thereof, means the maximum amount of anhydrous acid particles included in a sealing element such that the sealing element retains its functional integrity (prior to hydrolyzing the anhydrous acid particles), which is equivalent to about 74% by volume. In some embodiments, the anhydrous acid particles are present in an amount of about 0.5% to about 60% by volume of the sealing element 285, encompassing any value and subset therebetween. For example, the anhydrous acid particles may be present in an amount of about 0.5% to about 10%, or about 10% to about 20%, or about 20% to about 30%, or about 30% to about 40%, or about 40% to about 50%, or about 50% to about 60%, or about 10% to about 50%, or about 20% to about 40%, each by volume of the sealing element 285, encompassing any value and subset therebetween. In some preferred embodiments, the anhydrous acid particles are present in an amount of about 2% to about 30% by volume of the sealing element 285, encompassing any value and subset therebetween. Each of these values is critical to the embodiments described herein and depend on a number of factors including, but not limited to, the selected elastomer(s), the selected anhydrous acid particles, the desired rate of degradation of the sealing element 285, the conditions of the wellbore environment, and the like, and any combination thereof.

As previously stated, the anhydrous acid particles are solid in form and have a unit mesh size in the range of about 1 micrometers (μm) to about 6500 μm, encompassing any value and subset therebetween. As used herein, the term "unit mesh size," and grammatical variants thereof, refers to a size of an object (e.g., a particulate) that is able to pass through a square area having each side thereof equal to a specified numerical value. For example, the anhydrous acid particles may have a unit mesh size of about 1 μm to about 500 μm, or about 500 μm to about 1000 μm, or about 1000 μm to about 2000 μm, or about 2000 μm to about 3000 μm, or about 3000 μm to about 4000 μm, or about 4000 μm to about 5000 μm, or about 5000 μm to about 6000 μm, or about 500 μm to about 5500 μm, or about 1000 μm to about 5000 μm, or about 1500 μm to about 4500 μm, or about 2000 μm to about 4000 μm, or about 2500 μm to about 3500 μm, encompassing any value and subset therebetween. In some preferred embodiments, the anhydrous acid particles have a unit mesh size in the range of about 50 μm to about 1270 μm, encompassing any value and subset therebetween. Each of these values is critical to the embodiments of the present disclosure and depend on a number of factors including, but not limited to, the selected anhydrous acid particles, the size and shape of the sealing element 285 (or any applicable component of the body 210), the desired degradation rate of the sealing element 285, the formation process of the elastomer and/or the sealing element 285, the conditions of the wellbore environment, and the like, and any combination thereof. Accordingly, the anhydrous acid particles may be in powdered form (i.e., fine particles having a unit mesh size of less than about 150 μm, or about 1 μm to about 150 μm), particulate form (i.e., medium particles having a unit mesh size of greater than about 150 μm to about 2 millimeters (mm)), or granular form (i.e., large particles having a unit mesh size of greater than about 2 mm to about 6.5 mm). Other forms may additionally be suitable, without departing from the scope of the present disclosure.

The anhydrous acid particles may increase in unit mesh size upon hydrolyzing compared to their unit mesh size in anhydrous form. This increase in size may occur prior to complete hydrolyzation, which may render the anhydrous acid particles into a liquid phase. For example, in some instances, the anhydrous acid particles increase in unit mesh size by no more than about 1000% of the unit mesh size of the anhydrous acid particles prior to hydrolyzing in the presence of an aqueous fluid. As an example, an acrylate elastomer may increase in unit mesh size by about 1000% its original size upon hydrolyzing. As another specific example, the selected anhydrous acid particle may be anhydrous citric acid and once hydrated, the size of the anhydrous acid particle increases by about 7% by volume as the anhydrous citric acid forms citric acid monohydrate. The amount and extent, if any, of size increase will depend upon the type of anhydrous acid particles, the type of aqueous fluid contacted therewith, and the like, and any combination thereof.

The shape of the anhydrous acid particles may be any shape that meets the unit mesh size described herein. The shape may additionally be selected based on the particular anhydrous acid particle(s) selected, the particular elastomer(s) selected, the formation process of the elastomer and/or the sealing element 285, the desired degradation rate, and the like, and any combination thereof. Examples of suitable shapes for the anhydrous acid particles include, but are not limited to, spherical, spheroid, oblate, ovoid, ellipsoid, capsule-shaped, platelet-shaped, cubic-shaped, rectangular-shaped, rod-shaped, ellipse-shaped, cone-shaped, pyramid-shaped, planar-shaped, oblate-shaped, or cylinder-shaped, and any combination thereof. Accordingly, where the anhydrous acid particles are substantially non-spherical, the aspect ratio of the material may range such that the material is planar to such that it is cubic, octagonal, or any other configuration.

In some embodiments, some or all of the anhydrous acid particles forming the sealing element 285 (or the body 210) are at least partially encapsulated in a second material (e.g., a "sheath") formed from an encapsulating material capable of protecting or prolonging hydrolyzing the anhydrous acid particles and, thus, acceleration of the degradation of the sealing element 285. This second material encapsulation additionally prevents the anhydrous acid particles from interfering with the curing process of the elastomer and/or the sealing element 285 as a whole. Additionally, the anhydrous acid particles may be singly encapsulated in an encapsulating material or a plurality (i.e., two or more) of anhydrous acid particles may be together encapsulated in an encapsulating material. In other embodiments, the sealing element 285 (or the body 210 formed from a degradable material) is at least partially encapsulated in an encapsulating material to delay degradation, regardless of whether all or some of the anhydrous acid particles are also encapsulated in an encapsulating material. That is, a sealing element 285, for example, may be composed of anhydrous acid particles where one or more are encapsulated in an encapsulating material, and the sealing element 285 as a whole may additionally be optionally at least partially encapsulated in an encapsulating material. As used herein, the term "at least partially encapsulated" with reference to an encapsulating material, means that at least 50% of an outer surface of a material (e.g., one or more anhydrous acid particles or a component of a downhole tool (i.e., the sealing element 285 or a component of the body 210) is covered with the encapsulating material.

The sheath may also serve to protect the sealing element 285 and/or portion of the body 210 from abrasion within the wellbore 120, or protect the anhydrous acid particulates during formation of the sealing element 285 (e.g., by a casting process). The structure of the sheath may be permeable, frangible, or of a material that is at least partially removable at a desired rate within the wellbore environment. Whatever the structure, the sheath is designed such that it does not interfere with the ability of the sealing element 285 to form a fluid seal in the wellbore 120, or the body 210 to perform its necessary function. The encapsulating material forming the sheath may be any material capable of use in a downhole environment and, depending on the structure of the sheath may, or may not, be elastic such that it expands, such as when used to encapsulate the sealing element 285.

For example, a frangible sheath may break as the sealing element 285 expands to form a fluid seal, whereas a permeable sheath may remain in place on the sealing element 285 as it forms the fluid seal. As used herein, the term "permeable" refers to a structure that permits fluids (including liquids and gases) therethrough and is not limited to any particular configuration.

The encapsulating material forming the sheath may be of any material that the sealing element 285 or body 210 itself may be made of, as described above and below herein, including the elastomers of the present disclosure, whether including one or more additives, including the anhydrous acid particles. For example, the sheath may be made of a degradable material that degrades faster than the elastomer forming a portion of the sealing element 285. Other suitable encapsulating materials include, but are not limited to, a wax, a drying oil, a polyurethane, a crosslinked partially hydrolyzed polyacrylic, a silicate material, a glass material, an inorganic durable material, a polymer, a plastic, a polylactic acid, a polyvinyl alcohol, a polyvinylidene chloride, latex, and any combination thereof.

In some embodiments, the elastomer forming a portion of the sealing element 285 and/or the body 210 further includes an additive singly or in addition to the anhydrous acid particles (e.g., depending on the particular component of the downhole tool). In some embodiments, the additive is a solid oxidizing agent, which facilitates degradation of the elastomer. The solid oxidizing agent hydrolyzes in the presence of an aqueous fluid (e.g., in the wellbore environment) to form an oxidizing liquid. Examples of suitable oxidizing agents include, but are not limited to, a chlorate, a perchlorate (e.g., ammonium perchlorate), a chlorite, a peroxide, a nitrate (e.g., potassium nitrate), a nitrite, a persulfate (e.g., ammonium persulfate, sodium persulfate, and the like), and any combination thereof. The oxidizing agents are solid in form and may be any of the unit mesh sizes described above with reference to the anhydrous acid particles. An oxidizing agent may additionally be included in other degradable materials described herein, where appropriate, without departing from the scope of the present disclosure.

In some embodiments, the elastomer forming a portion of the sealing element 285 and/or body 210 may have a thermoplastic polymer embedded additive therein. The thermoplastic polymer additive may modify the strength, resiliency, or modulus of the elastomer. It may also aid in controlling the degradation rate of the sealing element 285 and/or body 210, alone or in addition to the anhydrous acid particles, where included. Suitable thermoplastic polymers may include, but are not limited to, polypropylene, an aliphatic polyester (e.g., polyglycolic acid, polylactic acid, polycaprolactone, polyhydroxyalkanoate, polyhydroxyalkanoiate, polyhydroxybutyrate, polyethylene adipate, polybutylene succinate, poly(lactic-co-glycolic) acid, poly(3-hydroxybutyrate-co-3-hydroxyvalerate), and any combination thereof. The amount of thermoplastic polymer that may be embedded in the elastomer forming the sealing element 285 and/or body 210 may be any amount that confers a desirable elasticity without compromising the desired amount of degradation. In some embodiments, the thermoplastic polymer may be included in an amount of from about 1% to about 91% by weight of the elastomer, encompassing any value or subset therebetween. For example, the thermoplastic polymer may be included in an amount of from about 1% to about 30%, or about 30% to about 60%, or about 60% to about 91% by weight of the elastomer, encompassing any value and subset therebetween. Each value is critical to the embodiments of the present disclosure and depends on a number of factors including, but not limited to, the desired elasticity, the desired degradability, the portion of the downhole tool 100 (FIG. 1) comprising the elastomer, the presence of other additives (including the anhydrous acid particles), and the like, and any combination thereof.

A reinforcing agent additive may additionally be included in the elastomer, which may increase the strength, stiffness, or salt creep resistance of the sealing element 285 and/or portion of the body 210 comprising the elastomer. Such reinforcing agent additives include, but are not limited to, a particulate, a fiber, a fiber weaver, and any combination thereof.

The particulate may be of any size suitable for embedding in the elastomer, such as a unit mesh size from about 37 μm to about 400 μm, encompassing any value or subset therebetween. For example, the particulate may have a unit mesh size from about 37 μm to 150 μm, or about 150 μm to about 300 μm, or about 300 μm to about 400 μm, encompassing any value and subset therebetween. Moreover, there is no need for the particulates to be sieved or screened to a particular or specific particle mesh size or particular particle size distribution, but rather a wide or broad particle size distribution can be used, although a narrow particle size distribution is also suitable. The particulate reinforcing agent additives may be any shape provided that they meet the desired unit mesh size, including those shapes discussed herein with reference to the anhydrous acid additives.

Particulates suitable for use as reinforcing agent additives in the embodiments described herein may comprise any material suitable for use in the elastomer that provides one or more of stiffness, strength, or creep resistance, or any other added benefit. Suitable materials for these particulates include, but are not limited to, organophilic clay, silica flour, metal oxide, sand, bauxite, ceramic materials, glass materials, polymer materials (e.g., ethylene vinyl acetate or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof.

The fibers for use as reinforcing agent additives in the elastomer described herein may be of any size and material capable of being included therein. In some embodiments, the fibers may have a length of less than about 3.175 centimeters (cm) (equivalent to 1.25 inches) and a width of less than about 0.0254 cm (equivalent to 0.01 inches). In some embodiments, a mixture of different sizes of fibers may be used. Suitable fibers may be formed from any material suitable for use as a particulate, as described previously, as well as materials including, but not limited to, carbon fibers, carbon nanotubes, graphene, fullerene, a ceramic fiber, a plastic fiber, a glass fiber, a metal fiber, and any combination thereof. In some embodiments, the fibers may be woven together to form a fiber weave for use in the elastomer.

In some embodiments, the reinforcing agent additive may be included in the elastomer in an amount of from about 1% to about 91% by weight of the elastomer, encompassing any value or subset therebetween. For example, reinforcing agent may be included in an amount of from about 1% to about 30%, or about 30% to about 60%, or about 60% to about 91% by weight of the elastomer, encompassing any value and subset therebetween. Each of these values is critical to the embodiments of the present disclosure and depends on a number of factors including, but not limited to, the desired stiffness of the elastomer, the desired strength of the elastomer, the desired salt creep resistance of the elastomer, the type of elastomer selected, the type of downhole tool having the elastomer included therein, the type and amount of other additives (including the anhydrous acid particles), and the like, and any combination thereof.

In some embodiments, the body 210, or a component thereof or a portion of a component thereof, may also be composed of the elastomers described herein, which may or may not include the anhydrous acid particles, or another degradable material type. However, unlike the sealing element 285, the body 210 (and most components thereof, e.g., slips, wedges, ball(s), and the like as previously described) is sufficiently rigid to provide structural integrity to the downhole tool, or frac plug 200. The body 210 may degrade in the wellbore environment such as when exposed to one or more of the stimuli capable of degrading the elastomers described above, including an aqueous fluid, an acid (e.g., formed from hydrolyzing the anhydrous acid particles), an elevated wellbore temperature, and the like. The aqueous fluid may be any aqueous fluid present in the wellbore environment including, but not limited to, those listed above. The body 210 may thermally degrade in a wellbore environment having temperatures greater than about 75° C. (or about 165° F.). The body 210 may also degrade upon contact with a hydrocarbon fluid in the wellbore environment. In such cases, the hydrocarbon fluid may include, but is not limited to, alkanes, olefins, aromatic organic compounds, cyclic alkanes, paraffins, diesel fluids, mineral oils, desulfurized hydrogenated kerosenes, and any combination thereof.

Accordingly, in some embodiments, the sealing element 285 is composed of the elastomer and anhydrous acid particles, and one or more components of the body 210 in contact with the sealing element 285 (e.g., a slip, a wedge, and the like) is also composed of a degradable material. Such contact may include a physical connection or attachment. In addition to the elastomers described herein, with or without the anhydrous acid particles, other suitable materials for forming the one or more components of the body 210 may include, but are not limited to, a polysaccharide, chitin, chitosan, a protein, an aliphatic polyester, poly(ε-caprolactone), a poly(hydroxybutyrate), poly(ethyleneoxide), poly(phenyllactide), a poly(amino acid), a poly(orthoester), polyphosphazene, a polylactide, a polyglycolide, a poly(anhydride) (e.g., poly(adipic anhydride), poly(suberic anhydride), poly(sebacic anhydride), poly(dodecanedioic anhydride), poly(maleic anhydride), and poly(benzoic anhydride), and the like), a polyepichlorohydrin, a copolymer of ethylene oxide/polyepichlorohydrin, a terpolymer of epichlorohydrin/ethylene oxide/allyl glycidyl ether, and any combination thereof. Suitable materials for forming one or more components of the body 210 may also include, but are not limited to, metals or metal alloys that include magnesium, aluminum, iron, nickel, copper, gallium, zinc, zirconium, and the like, and any combination thereof. Combinations of the foregoing polymers and metals/metal alloys may be used in forming the body 210.

In some embodiments, hydrolyzing the anhydrous acid particles forming a portion of the sealing element 285 (and where applicable included in one or more components of the body 210) aid in accelerating degradation of both the sealing element 285 and any degradable component of the body 210. That is, the anhydrous acid particles hydrolyze to generate acids that not only accelerate degradation of the elastomers described herein, but also are capable of accelerative degradable metals and metal alloys (e.g., magnesium or aluminum metal and metal alloys, and the like). In some embodiments, independent of the anhydrous acid particles, the body 210 and/or the sealing element 285 releases a degradation accelerant that is not formed from hydrolyzing an anhydrous acid particle(s) to accelerate degradation of one or both of the body 210 and/or the sealing element 285. For example, the accelerant may be a natural component that is released upon degradation of either the body 210 or the sealing element 285, such as an acid (e.g., release of an acid upon degradation of the body 210 formed from a polylactide). Similarly, the body 210 may release a base that would aid in degrading the sealing element 285, such as, for example, if the body 210 were composed of a galvanically reacting material. In other cases, the accelerant may be embedded in the material forming either or both of the body 210 and the sealing element 285 (e.g., the elastomer). The accelerant may be in any form, including a solid or a liquid. In other embodiments, the accelerant can be a natural byproduct of the degradation of the material and is not specifically added to act as an accelerant.

Suitable accelerants may include, but are not limited to, a crosslinker, sulfur, a sulfur releasing agent, a peroxide, a peroxide releasing agent, a catalyst, an acid, an acid releasing agent other than the anhydrous acid particles described herein, a base, a base releasing agent, and any combination thereof. In some embodiments, the accelerant may cause the body 210 or the sealing element 285 to become brittle to aid in degradation. Specific accelerants may include, but are not limited to, a polylactide, a polyglycolide, an ester, a cyclic ester, a diester, a lactone, an amide, an alkali metal alkoxide, a carbonate, a bicarbonate, an alcohol, an alkali metal hydroxide, ammonium hydroxide, sodium hydroxide, potassium hydroxide, an amine, an alkanol amine, an inorganic acid or precursor thereof (e.g., hydrochloric acid, hydrofluoric acid, ammonium bifluoride, and the like), an organic acid or precursor thereof (e.g., formic acid, acetic acid, lactic acid, glycolic acid, aminopolycarboxylic acid, polyaminopolycarboxylic acid, and the like), and any combination thereof. As an example, the degradation of an elastomer described herein (e.g., forming all or a portion of the sealing element 285) can produce adipic acid, succinic acid, or isophthalic acid during its degradation, and the released acid will lower the pH of a wellbore fluid (introduced or naturally occurring, such as produced wellbore fluids) and accelerate the degradation of an aluminum alloy or magnesium alloy forming all or a portion of the body 210.

The accelerant, when embedded in the body 210 or the sealing element 285, may be present in the range of from about 0.01% to about 25% by weight of the body 210 or the sealing element 285 (including the anhydrous acid particles) (in addition to the anhydrous acid particles), encompassing any value and subset therebetween. For example, the accelerant may be present of from about 0.01% to about 5%, or about 5% to about 10%, or about 10% to about 25% by weight of the body 210 or the sealing element 285 (including the anhydrous acid particles), encompassing any value and subset therebetween. Each of these values is critical to the embodiments of the present disclosure and may depend on a number of factors including, but not limited to, the material forming the body 210, the elastomer forming a portion of the sealing element 285, the type and amount of anhydrous acid particles forming a portion of the sealing element 285, the desired degradation rate of the body 210 and/or the sealing element 285, and the like, and any combination thereof.

Each of the individual components forming the body 210 and the sealing element 285 (i.e., the elastomer, the anhydrous acid particles, and any additional additives) is preferably present in the body 210 and the sealing element 285 uniformly (i.e., distributed uniformly throughout). The choices and relative amounts of each component are adjusted for the particular downhole operation (e.g., fracturing, workover, and the like) and the desired degradation rate (i.e., accelerated, rapid, or normal) of the body 210 and/or sealing element 285. Factors that may affect the selection and amount of components may include, for example, the temperature of the subterranean formation in which the downhole operation is being performed, the expected amount of degradation stimulant (e.g., aqueous fluid) in the wellbore environment, the amount of elasticity required for the sealing element 285 (e.g., based on wellbore diameter, for example), the duration of the downhole operation, and the like, and any combination thereof.

Figure 3:
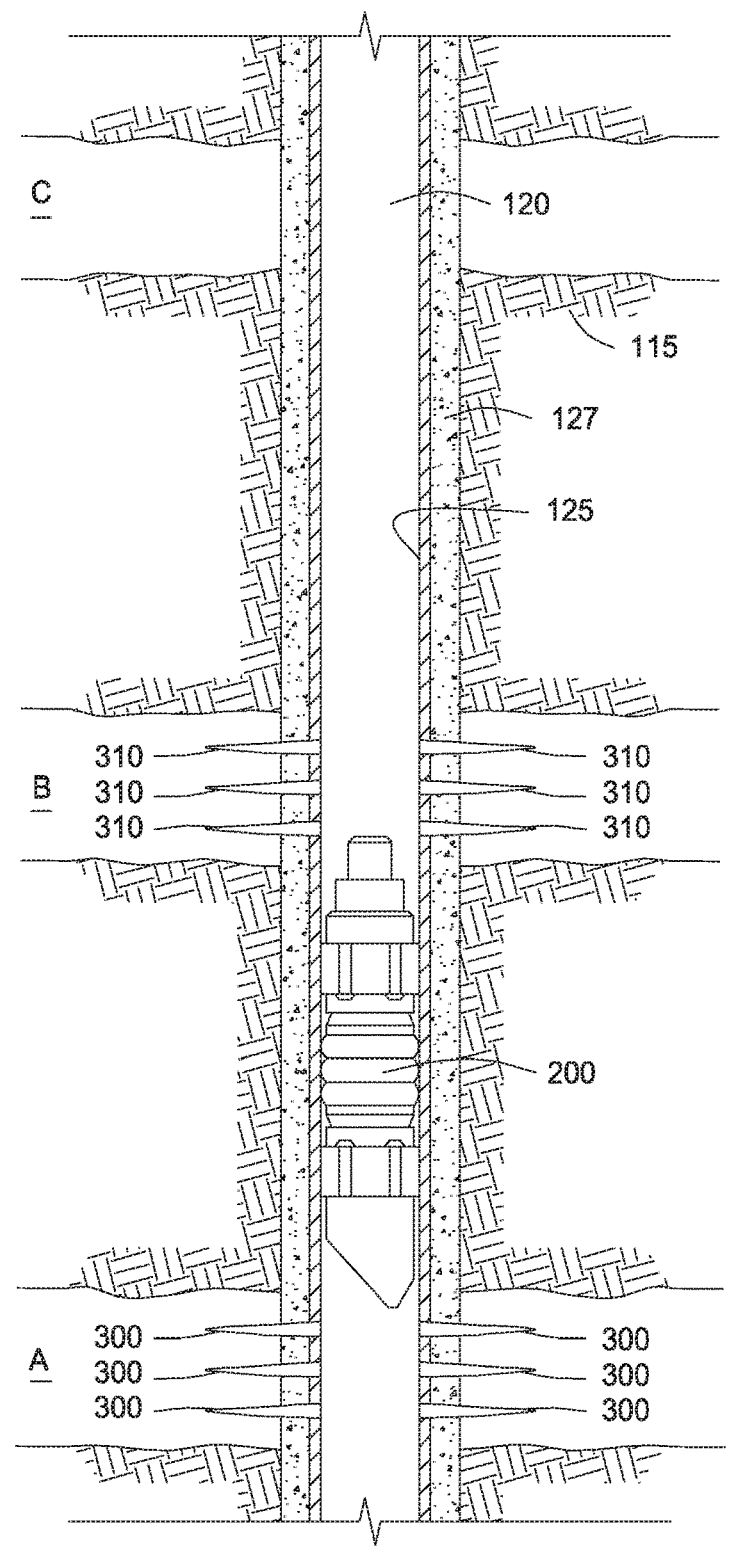
FIG. 3 shows an enlarged cross-sectional view of a downhole tool in operation, according to one or more embodiments described herein.

Referring again to FIG. 2, in operation the frac plug 200 may be used in a downhole fracturing operation to isolate a zone of the formation 115 below the frac plug 200. Referring now to FIG. 3, with continued reference to FIG. 2, the frac plug 200 is shown disposed between producing zone A and producing zone B in formation 115. In a conventional fracturing operation, before, after, or in conjunction with setting the frac plug 200 to isolate zone A from zone B, a plurality of perforations 300 are made by a perforating tool (not shown) through the casing 125 and cement 127 to extend into producing zone A. Then a well stimulation fluid is introduced into the wellbore 120, such as by lowering a tool (not shown) into the wellbore 120 for discharging the fluid at a relatively high pressure or by pumping the fluid directly from the derrick 112 (FIG. 1) into the wellbore 120. The well stimulation fluid passes through the perforations 300 into producing zone A of the formation 115 for stimulating the recovery of fluids in the form of oil and gas containing hydrocarbons. These production fluids pass from zone A, through the perforations 300, and up the wellbore 120 for recovery at the surface 105 (FIG. 1).

The frac plug 200 is then lowered by the tool string 118 (FIG. 1) to the desired depth within the wellbore 120, and the sealing element 285 (FIG. 2) is set against the casing 125, thereby isolating zone A as depicted in FIG. 3. Due to the design of the frac plug 200, the flowbore 205 (FIG. 2) of the frac plug 200 allows fluid from isolated zone A to flow upwardly through the frac plug 200 while preventing flow downwardly into the isolated zone A. Accordingly, the production fluids from zone A continue to pass through the perforations 300, into the wellbore 120, and upwardly through the flowbore 205 of the frac plug 200, before flowing into the wellbore 120 above the frac plug 200 for recovery at the surface 105.

After the frac plug 200 is set into position, as shown in FIG. 3, a second set of perforations 310 may then be formed through the casing 125 and cement 127 adjacent intermediate producing zone B of the formation 115. Zone B is then treated with well stimulation fluid, causing the recovered fluids from zone B to pass through the perforations 310 into the wellbore 120. In this area of the wellbore 120 above the frac plug 200, the recovered fluids from zone B will mix with the recovered fluids from zone A before flowing upwardly within the wellbore 120 for recovery at the surface 105.

If additional fracturing operations will be performed, such as recovering hydrocarbons from zone C, additional frac plugs 200 may be installed within the wellbore 120 to isolate each zone of the formation 115. Each frac plug 200 allows fluid to flow upwardly therethrough from the lowermost zone A to the uppermost zone C of the formation 115, but pressurized fluid cannot flow downwardly through the frac plug 200.

After the fluid recovery operations are complete, the frac plug 200 must be removed from the wellbore 120. In this context, as stated above, at least a portion of the sealing element 285 and/or body 210 (FIG. 2) of the frac plug 200 may degrade by exposure to the wellbore environment. For example, the sealing element 285 and/or the body 210 may degrade upon prolonged contact with fluids present naturally or introduced in the wellbore 120, or other conditions in the wellbore 120. Other combinations of degradability are suitable, without departing from the scope of the present disclosure, as discussed above, for example.

Accordingly, in an embodiment, the frac plug 200 is designed to decompose over time while operating in a wellbore environment, thereby eliminating the need to mill or drill the frac plug 200 out of the wellbore 120. Thus, by exposing the frac plug 200 to the wellbore environment, at least some of its components will decompose, causing the frac plug 200 to lose structural and/or functional integrity and release from the casing 125. The remaining components of the frac plug 200 will simply fall to the bottom of the wellbore 120. In various alternate embodiments, degrading one or more components of a downhole tool 100 performs an actuation function, opens a passage, releases a retained member, or otherwise changes the operating mode of the downhole tool 100. Also, as described above, the material or components embedded therein for forming the body 210 and sealing element 285 of the frac plug 200, as well as the use of the optional sheath, may be selected to control the decomposition rate of the frac plug 200.

Referring again to FIG. 1, removing the downhole tool 100 from its attachment in the wellbore 120 is more cost effective and less time consuming than removing conventional downhole tools, which require making one or more trips into the wellbore 120 with a mill or drill to gradually grind or cut the tool away. Instead, the downhole tools 100 described herein are removable by simply exposing the tools 100 to a naturally occurring or standard downhole environment (e.g., fluids present in a standard downhole environment, temperature, pressures, salinity, and the like) over time. The foregoing descriptions of specific embodiments of the downhole tool 100, and the systems and methods for removing the downhole tool 100 from the wellbore 120 have been presented for purposes of illustration and description and are not intended to be exhaustive or to limit this disclosure to the precise forms disclosed. Many other modifications and variations are possible. In particular, the type of downhole tool 100, or the particular components that make up the downhole tool 100 (e.g., the body and sealing element) may be varied. For example, instead of a frac plug 200 (FIG. 2), the downhole tool 100 may comprise a bridge plug, which is designed to seal the wellbore 120 and isolate the zones above and below the bridge plug, allowing no fluid communication in either direction. Alternatively, the downhole tool 100 could comprise a packer that includes a shiftable valve such that the packer may perform like a bridge plug to isolate two formation zones, or the shiftable valve may be opened to enable fluid communication therethrough. Similarly, the downhole tool 100 could comprise a wiper plug or a cement plug.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include Embodiment A, Embodiment B, and Embodiment C.

Embodiment A: A downhole tool comprising: a body; and at least one sealing element composed of an elastomer and anhydrous acid particles, and wherein at least a portion of the sealing element hydrolytically degrades in a wellbore environment.

Embodiment B: A method comprising: installing a downhole tool in a wellbore, the downhole tool comprising a body and at least one sealing element composed of an elastomer and anhydrous acid particles, wherein at least a portion of the sealing element hydrolytically degrades in a wellbore environment; fluidly sealing two sections of the wellbore with the sealing element of the downhole tool, the sealing element capable of holding a differential pressure; performing a downhole operation; exposing at least a portion of the anhydrous acid particles to an aqueous fluid in the wellbore environment, thereby hydrating the exposed anhydrous acid particles and forming an acid; and hydrolytically degrading at least a portion of the sealing element in the wellbore environment, wherein the hydrolytic degradation is accelerated by exposure to the acid in the wellbore environment, and wherein the hydrolytic degradation causes the sealing element to no longer hold the differential pressure.

Embodiment C: A system comprising: a tool string extending through a surface and into a wellbore; and a downhole tool connected to the tool string, the downhole tool comprising: a body; and at least one sealing element composed of an elastomer and anhydrous acid particles, and wherein at least a portion of the sealing element hydrolytically degrades in a wellbore environment.

Embodiments A, B, and C may have one or more of the following additional elements in any combination:

Element 1: Wherein the anhydrous acid particles are pro-acids.

Element 2: Wherein the anhydrous acid particles react with an aqueous fluid in the wellbore environment to form an acid selected from the group consisting of a carboxylic acid, a polycarboxylic acid, an amino carboxylic acid, an amino polycarboxylic acid, a mineral acid, an organic acid, and any combination thereof.

Element 3: Wherein the anhydrous acid particles are present in an amount of about 0.5% to about 60% by volume of the sealing element.

Element 4: Wherein the anhydrous acid particles have a unit mesh size of about 1 micrometers to about 6500 micrometers.

Element 5: Wherein at least a portion of the anhydrous acid particles are encapsulated in an encapsulating material.

Element 6: Wherein the elastomer is selected from the group consisting of a polyurethane rubber, a polyester-based polyurethane rubber, a polyether-based polyurethane rubber, a thiol-based rubber, a hyaluronic acid rubber, a polyhydroxobutyrate rubber, a polyester elastomer, a polyester amide elastomer, a polyamide elastomer, a starch-based resin, a polyethylene terephthalate polymer, a polybutylene terephthalate polymer, a polybutylene terephthalate polymer, a polylactic acid polymer, a polybutylene succinate polymer, a polybutylene succinate polymer, an acrylate-based polymer, a blend of chlorobutadiene rubber/reactive clay/crosslinked sodium polyacrylate, a polystyrene polymer, a cellulose-based rubber, a polyethylene glycol-based hydrogel, a silicone-based hydrogel, a polyacrylamide-based hydrogel, a polymacon-based hydrogel, copolymers thereof, terpolymers thereof, and any combination thereof.

Element 7: Wherein the elastomer is a cast elastomer.

Element 8: Wherein the anhydrous acid particles react with an aqueous fluid in the wellbore environment to form an acid, and wherein the reaction between the anhydrous acid particles and the aqueous fluid causes the anhydrous acid particles to increase in unit mesh size.

Element 9: Wherein the downhole tool comprises a plurality of components and wherein the sealing element is in contact with at least one component composed of a degradable metal.

Element 10: Wherein the downhole tool is a wellbore isolation device.

By way of non-limiting example, exemplary combinations of the above elements, which combinations are applicable to Embodiments A, B, and C, include: 1-10; 1, 3, and 9; 3 and 5; 4, 5, 8, and 10; 3 and 8; 4, 7, and 10; 2 and 5; 3, 4, and 9; 1 and 7; 2, 4, 8, and 9; and the like.

To facilitate a better understanding of the embodiments of the present disclosure, the following examples of preferred or representative embodiments are given. In no way should the following examples be read to limit, or to define, the scope of the disclosure.

EXAMPLE 1

Figure 4:
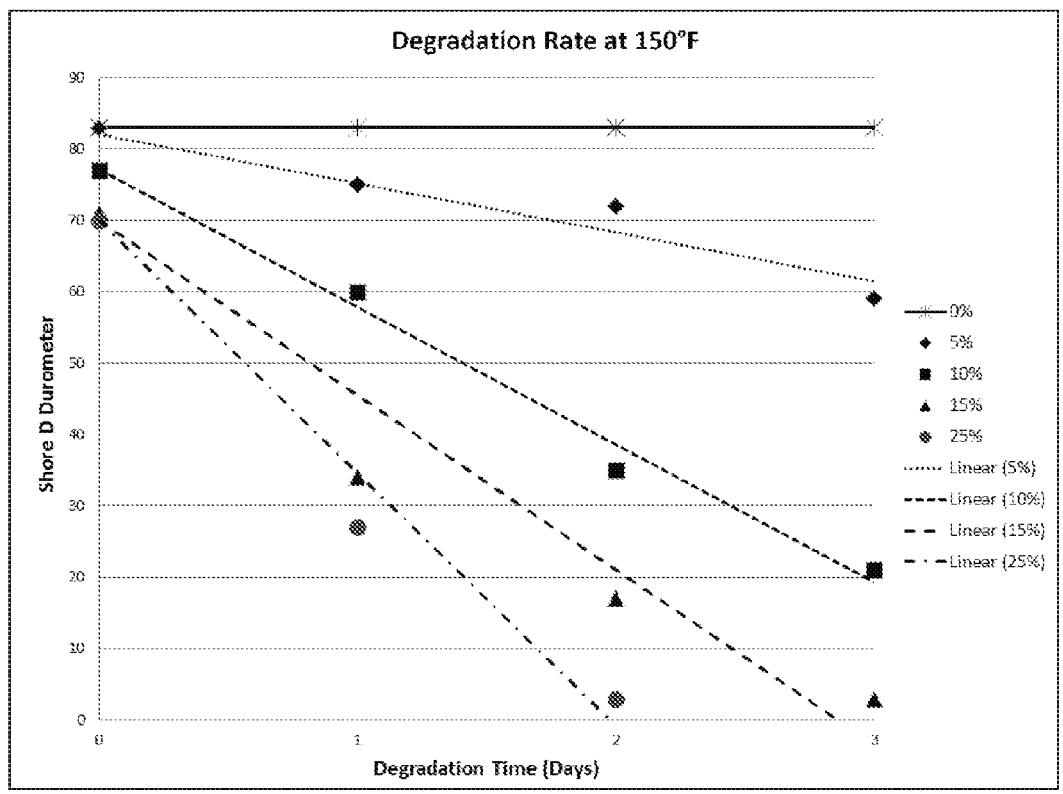
FIG. 4 shows the degradation of an elastomer comprising various amounts of anhydrous citric acid particles after three (3) days of incubation in tap water at 150° F.

In this example, the degradation rate in terms of mechanical integrity (Shore D durometer) of cast polyester-based polyurethane samples having 0%, 5%, 10%, 15%, or 25% anhydrous citric acid particles included therein during the casting process were evaluated after three (3) days of incubation in tap water at 150° F. (equivalent to 65.6° C.). As shown in FIG. 4, each of the 5%, 10%, 15%, and 25% anhydrous citric acid-containing particles samples exhibited increased mechanical integrity loss compared to the 0% anhydrous citric-acid containing particles sample. The rate of mechanical loss increased with the increasing concentration of anhydrous acid particles. Indeed, the 25% anhydrous citric-acid containing particle sample lost almost all mechanical integrity in 2 days, and the 15% anhydrous citric-acid containing particle sample lost almost all mechanical integrity in 3 days. It is also apparent that the cast polyester-based polyurethane having 0% anhydrous acid particles exhibited little to no change in its mechanical properties during the elapsed time period. FIG. 4 shows the precise durometer measurements at 0, 1, and 3 days, and a linear regression for each sample type.

EXAMPLE 2

Figure 5:
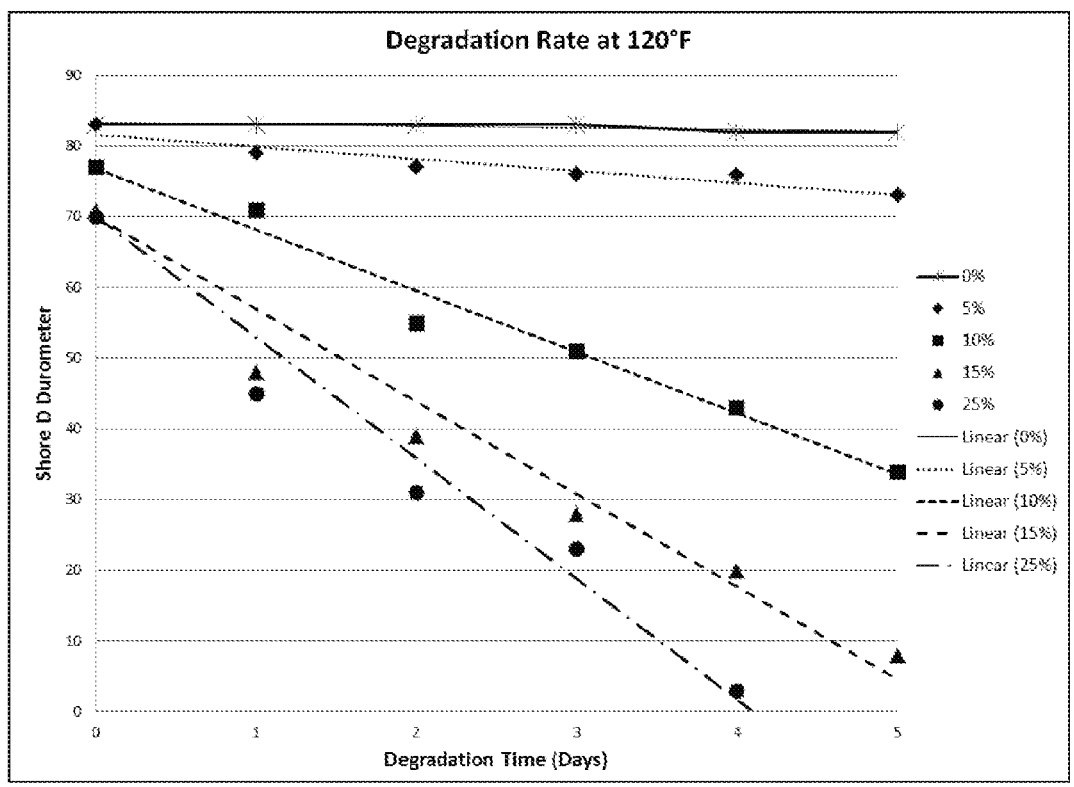
FIG. 5 shows the degradation of an elastomer comprising various amounts of anhydrous citric acid particles after four (4) days of incubation in tap water at 116° F.

In this example, the degradation rate in terms of mechanical integrity (Shore D durometer) of cast polyester-based polyurethane samples having 0%, 10%, 15%, or 25% anhydrous citric acid particles included therein during the casting process were evaluated after five (5) days of incubation in tap water at 120° F. (equivalent to 48.9° C.). As shown in FIG. 5, after five days, each of the 5%, 10%, 15%, and 25% mechanical integrity loss compared to the 0% anhydrous citric-acid containing particles sample, although at a slower rate than at the higher temperature of Example 1. The rate of mechanical loss increased with the increasing concentration of anhydrous acid particles. For example, the 25% anhydrous citric-acid containing particle sample lost almost all mechanical integrity in 4 days, and the 15% anhydrous citric-acid containing particle sample lost almost all mechanical integrity in 5 days. It is also apparent that the cast polyester-based polyurethane having 0% anhydrous acid particles exhibited little to no change in its mechanical properties during the elapsed time period. FIG. 5 shows the precise durometer measurements at 0, 1, and 3 days, and a linear regression for each sample type.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A downhole tool comprising:
    a body; and
    at least one sealing element composed of an elastomer and anhydrous acid particles, wherein the anhydrous acid particles react with an aqueous fluid in a wellbore environment to form an acid selected from the group consisting of a carboxylic acid, a polycarboxylic acid, an amino carboxylic acid, an amino polycarboxylic acid, an organic acid, and any combination thereof, and wherein at least a portion of the sealing element hydrolytically degrades in the wellbore environment.

2. The downhole tool of claim 1, wherein the anhydrous acid particles are present in an amount of about 0.5% to about 60% by volume of the sealing element.

3. The downhole tool of claim 1, wherein the anhydrous acid particles have a unit mesh size of about 1 micrometers to about 6500 micrometers.

4. The downhole tool of claim 1, wherein at least a portion of the anhydrous acid particles are encapsulated in an encapsulating material.

5. The downhole tool of claim 1, wherein the elastomer is selected from the group consisting of a polyurethane rubber, a polyester-based polyurethane rubber, a polyether-based polyurethane rubber, a thiol-based rubber, a hyaluronic acid rubber, a polyhydroxobutyrate rubber, a polyester elastomer, a polyester amide elastomer, a polyamide elastomer, a starch-based resin, a polyethylene terephthalate polymer, a polybutylene terephthalate polymer, a polybutylene terephthalate polymer, a polylactic acid polymer, a polybutylene succinate polymer, a polybutylene succinate polymer, an acrylate-based polymer, a blend of chlorobutadiene rubber/reactive clay/crosslinked sodium polyacrylate, a polystyrene polymer, a cellulose-based rubber, a polyethylene glycol-based hydrogel, a silicone-based hydrogel, a polyacrylamide-based hydrogel, a polymacon-based hydrogel, copolymers thereof, terpolymers thereof, and any combination thereof.

6. The downhole tool of claim 1, wherein the elastomer is a cast elastomer.

7. The downhole tool of claim 1, wherein the anhydrous acid particles react with an aqueous fluid in the wellbore environment to form an acid, and wherein the reaction between the anhydrous acid particles and the aqueous fluid causes the anhydrous acid particles to increase in unit mesh size.

8. The downhole tool of claim 1, wherein the downhole tool comprises a plurality of components and wherein the sealing element is in contact with at least one component composed of a degradable metal.

9. The downhole tool of claim 1, wherein the downhole tool is a wellbore isolation device.

10. A method comprising:
installing a downhole tool in a wellbore, the downhole tool comprising a body and at least one sealing element composed of an elastomer and anhydrous acid particles, wherein the anhydrous acid particles react with an aqueous fluid in a wellbore environment to form an acid selected from the group consisting of a carboxylic acid, a polycarboxylic acid, an amino carboxylic acid, an amino polycarboxylic acid, an organic acid, and any combination thereof, wherein at least a portion of the sealing element hydrolytically degrades in the wellbore environment;
fluidly sealing two sections of the wellbore with the sealing element of the downhole tool, the sealing element capable of holding a differential pressure;
performing a downhole operation;
exposing at least a portion of the anhydrous acid particles to an aqueous fluid in the wellbore environment, thereby hydrating the exposed anhydrous acid particles and forming an acid; and
hydrolytically degrading at least a portion of the sealing element in the wellbore environment, wherein the hydrolytic degradation is accelerated by exposure to the acid in the wellbore environment, and wherein the hydrolytic degradation causes the sealing element to no longer hold the differential pressure.

11. The method of claim 10, wherein the anhydrous acid particles are present in an amount of about 0.5% to about 60% by volume of the sealing element.

12. The method of claim 10, wherein the anhydrous acid particles have a unit mesh size of about 1 micrometers to about 6500 micrometers.

13. The method of claim 10, wherein the elastomer is a cast elastomer.

14. The method of claim 10, wherein the downhole tool is a wellbore isolation device.

15. A system comprising:
a tool string extending through a surface and into a wellbore; and
a downhole tool connected to the tool string, the downhole tool comprising:
a body; and
at least one sealing element composed of an elastomer and anhydrous acid particles, wherein the anhydrous acid particles react with an aqueous fluid in a wellbore environment to form an acid selected from the group consisting of a carboxylic acid, a polycarboxylic acid, an amino carboxylic acid, an amino polycarboxylic acid, an organic acid, and any combination thereof, and wherein at least a portion of the sealing element hydrolytically degrades in the wellbore environment.

16. The system of claim 15, wherein the anhydrous acid particles are present in an amount of about 0.5% to about 60% by volume of the sealing element.

17. The system of claim 15, wherein the anhydrous acid particles have a unit mesh size of about 1 micrometers to about 6500 micrometers.

18. The system of claim 15, wherein the elastomer is a cast elastomer.

19. The system of claim 15, wherein the downhole tool is a wellbore isolation device.

* * * * *